United States Patent
Hua et al.

(12) 
(10) Patent No.: US 12,418,814 B2
(45) Date of Patent: Sep. 16, 2025

(54) MEASUREMENT METHOD, APPARATUS, AND SYSTEM

(71) Applicant: HUAWEI TECHNOLOGIES CO., LTD., Guangdong (CN)

(72) Inventors: Meng Hua, Shanghai (CN); Yi Long, Beijing (CN); Shurong Jiao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 556 days.

(21) Appl. No.: 17/725,049

(22) Filed: Apr. 20, 2022

(65) Prior Publication Data

US 2022/0248245 A1 Aug. 4, 2022

Related U.S. Application Data

(63) Continuation of application No. PCT/CN2019/112605, filed on Oct. 22, 2019.

(51) Int. Cl.
H04W 24/08 (2009.01)
H04L 1/00 (2006.01)
H04W 72/044 (2023.01)

(52) U.S. Cl.
CPC .......... *H04W 24/08* (2013.01); *H04L 1/0013* (2013.01); *H04W 72/044* (2013.01)

(58) Field of Classification Search
CPC .... H04W 24/08; H04W 72/044; H04L 1/0013
See application file for complete search history.

(56) References Cited

U.S. PATENT DOCUMENTS

| 2015/0163823 | A1 | 6/2015 | Sadek et al. |
| 2019/0141695 | A1 | 5/2019 | Babaei et al. |
| 2019/0166625 | A1* | 5/2019 | Nam ............... H04L 1/0058 |
| 2019/0207737 | A1 | 7/2019 | Babaei et al. |

(Continued)

FOREIGN PATENT DOCUMENTS

| CN | 103907298 A | 7/2014 |
| CN | 109391994 A | 2/2019 |
| CN | 109644034 A | 4/2019 |

(Continued)

OTHER PUBLICATIONS

Office Action in Indian Appln. No. 202217025269, dated Sep. 9, 2022, 7 pages (with English translation).

(Continued)

*Primary Examiner* — Elton Williams
(74) *Attorney, Agent, or Firm* — Fish & Richardson P.C.

(57) ABSTRACT

Example measurement methods and apparatus are described. One example method includes receiving first information and second information from a network device by a terminal device. The terminal device determines a first resource based on the first information, and determines a second resource based on the second information. Further, the terminal device determines a third resource based on the first resource and the second resource, and performs measurement on the third resource. The third resource includes a part of or all resources in the first resource except a first overlapping resource, and the first overlapping resource is an overlapping resource of the first resource and the second resource.

20 Claims, 16 Drawing Sheets

(56) References Cited

U.S. PATENT DOCUMENTS

2019/0260510 A1    8/2019  Lin
2021/0050974 A1*  2/2021  Manolakos ........... H04W 72/54

FOREIGN PATENT DOCUMENTS

WO      2018082043 A1    5/2018
WO      2018148947 A1    8/2018

OTHER PUBLICATIONS

Extended European Search Report in European Appln No. 19950190. 9, dated Sep. 15, 2022, 7 pages.
3GPP TS 38.214 V15.7.0 (Sep. 2019), "3rd Generation Partnership Project; Technical Specification Group Radio Access Network; NR; Physical Layer Procedures for Data (Release 15)," Sep. 2019, 106 pages.
3GPP TS 38.331 V15.7.0 (Sep. 2019), "3rd Generation Partnership Project; Technical Specification Group Radio Access Network; NR; Radio Resource Control (RRC) Protocol Specification (Release 15)," Sep. 2019, 527 pages.
PCT International Search Report and Written Opinion issued in International Application No. PCT/CN2019/112605 on Jun. 23, 2020, 18 pages (with English translation).

* cited by examiner

MEASUREMENT METHOD, APPARATUS, AND SYSTEM

CROSS-REFERENCE TO RELATED APPLICATIONS

This application is a continuation of International Application No. PCT/CN2019/112605, filed on Oct. 22, 2019, the disclosure of which is hereby incorporated by reference in its entirety.

TECHNICAL FIELD

This application relates to the field of wireless communication technologies, and in particular, to a measurement method, an apparatus, and a system.

BACKGROUND

In a new radio (NR) system in a fifth generation (5G) mobile communication system, some resources unavailable for sending a physical downlink shared channel (PDSCH) are defined, and are referred to as rate matching resources. These resources may be for implementing forward or backward compatibility of the NR system. For example, some resources are periodically allocated in NR resources to a future system or a function for use. In addition, the International Telecommunication Union (ITU) defines three application scenarios for an NR system and a future mobile communication system, including: enhanced mobile broadband (eMBB), ultra-reliable and low-latency communications (URLLC), and massive machine-type communications (mMTC). An URLLC service is mainly characterized by ultra-high reliability, a low latency, a small data transmission amount, and burstiness.

A rate matching resource is for forward and backward compatibility, and an URLLC service requires ultra-high reliability and a low latency. Therefore, the rate matching resource and the URLLC service may be of high priority. If a rate matching resource or a PDSCH resource carrying URLLC service data overlaps a measurement resource, the measurement resource is highly interfered with. In this application, the measurement resource may be, for example, a non-zero power (NZP) channel state information (CSI)-reference signal (RS) resource or a CSI-interference measurement (IM) resource.

For example, if an NZP CSI-RS resource of a terminal device overlaps a PDSCH resource carrying URLLC service data of another terminal device, an NZP CSI-RS on the NZP CSI-RS resource and the URLLC service data on the PDSCH resource interfere with each other. If a CSI-IM resource of a terminal device overlaps a PDSCH resource carrying URLLC service data of another terminal device, interference measurement performed on the CSI-IM resource is interfered with by the URLLC service data on the PDSCH resource, affecting interference measurement accuracy of the terminal device. In this application, that two resources overlap each other may mean that the two resources partially or completely overlap each other.

Alternatively, for example, if an NZP CSI-RS resource of a terminal device overlaps a rate matching resource, an NZP CSI-RS on the NZP CSI-RS resource and a signal on the rate matching resource for forward or backward compatibility interfere with each other; if a CSI-IM resource of a terminal device overlaps a rate matching resource, interference measurement performed on the CSI-IM resource is interfered with by a signal on the rate matching resource for forward or backward compatibility, affecting interference measurement accuracy of the terminal device.

During scheduling by a base station, it may be ensured that an NZP CSI-RS resource/a CSI-IM resource does not overlap a rate matching resource/a PDSCH resource carrying URLLC service data, to resolve the foregoing problem. However, the NZP CSI-RS resource and the CSI-IM resource may be periodic or semi-persistent (SP), and the URLLC service data is relatively randomly scheduled. The rate matching resource needs to be flexibly configured based on application scenarios of forward or backward compatibility. Therefore, ensuring that the NZP CSI-RS resource/CSI-IM resource does not overlap the rate matching resource/the PDSCH resource carrying URLLC service data may increase scheduling complexity and reduce scheduling flexibility.

SUMMARY

Embodiments of this application provide a measurement method, an apparatus, and a system, to avoid interference from another signal on a measurement resource, and improve measurement performance.

To achieve the foregoing objective, the following technical solutions are used in embodiments of this application.

According to a first aspect, a measurement method is provided. A communication apparatus performing the method may be a terminal device, or may be a module, for example, a chip, used in a terminal device. The following is described by using an example in which an execution body is a terminal device. The terminal device receives first information and second information from a network device, determines a first resource based on the first information, and determines a second resource based on the second information. Further, the terminal device determines a third resource based on the first resource and the second resource. The third resource includes a part of or all resources in the first resource except a first overlapping resource, and the first overlapping resource is an overlapping resource of the first resource and the second resource. Finally, the terminal device performs measurement on the third resource. Based on the measurement method provided in this embodiment of this application, the terminal device may perform measurement on a part of or all resources in the first resource except the first overlapping resource. In other words, the terminal device does not perform measurement on the overlapping resource of the first resource and the second resource, or the terminal device performs measurement neither on the overlapping resource of the first resource and the second resource nor on a related resource of the overlapping resource. Therefore, measurement performance degradation caused by interference from another signal on the measurement resource can be avoided.

In a possible design, the second information is configuration information of a rate matching resource, and the second resource is the rate matching resource; or the second information is a pre-emption indication PI, and the second resource is a pre-emption resource indicated by the PI.

In a possible design, the third resource is a resource that is in the first resource and that does not overlap a fourth resource, the fourth resource includes a resource in a first frequency domain range and a first time domain symbol of the first resource, the first time domain symbol is a time domain symbol in a time domain resource corresponding to the first overlapping resource, the first frequency domain range includes a frequency domain range in which a second overlapping resource is located, and the second overlapping resource is an overlapping resource in the first time domain symbol of the first overlapping resource.

In a possible design, the fourth resource further includes a resource in the first frequency domain range and a second time domain symbol of the first resource, and the second time domain symbol is a time domain symbol in a time domain code division multiplexing CDM relationship with the second overlapping resource. That is, considering a code division multiplexing resource, if a measurement signal transmitted on each of N REs is a sum of signals obtained by performing orthogonal code processing on measurement signals of N antenna ports, a receive end can process measurement signals from the N REs only after receiving all of the measurement signals, to obtain the measurement signals corresponding to the N antenna ports. Therefore, if the fourth resource includes the resource in the first frequency domain range and the first time domain symbol of the first resource, the fourth resource may further include the resource in the first frequency domain range and the second time domain symbol of the first resource, and the second time domain symbol is a time domain symbol in a time domain code division multiplexing CDM relationship with the second overlapping resource. The second time domain symbol is a time domain symbol in a time domain code division multiplexing CDM relationship with the second overlapping resource, that is, the resource in the first frequency domain range and the second time domain symbol of the first resource is in a time domain CDM relationship with the resource in the first frequency domain range and the first time domain symbol of the first resource. Therefore, measurement signals carried on the resource in the first frequency domain range and the first time domain symbol of the first resource and the resource in the first frequency domain range and the second time domain symbol of the first resource are mapped to a plurality of antenna ports through CDM. If a measurement signal carried on the resource in the first frequency domain range and the first time domain symbol of the first resource is punctured, a measurement signal carried on the resource in the first frequency domain range and the second time domain symbol of the first resource cannot be correctly demodulated. Based on this solution, because the fourth resource further includes the resource in the first frequency domain range and the second time domain symbol of the first resource, a receiver side can correctly demodulate a complete measurement signal, improving measurement performance.

In a possible design, when the measurement is broadband measurement, the first frequency domain range is a frequency domain range corresponding to the first resource; or when the measurement is subband measurement, the first frequency domain range is a frequency domain range corresponding to a subband in which the second overlapping resource is located.

In a possible design, a time domain resource of the first resource is not later than a time domain location of a CSI reference resource corresponding to a channel state information CSI report, and the time domain location of the CSI reference resource is a downlink slot (n−N−K) when the second resource is the pre-emption resource indicated by the PI, where $$n = \left\lfloor n' \cdot \frac{2^{\mu_{DL}}}{2^{\mu_{UL}}} \right\rfloor,$$

$\mu_{DL}$ and $\mu_{UL}$ are respectively an index of a downlink subcarrier spacing SCS and an index of an uplink SCS, N is determined based on a parameter in the first information, both N and K are non-negative integers, and n' is a slot index for sending the CSI report. In other words, considering that when the second resource is the pre-emption resource indicated by the PI, the pre-emption resource indicated by the PI may be learned based on DCI carrying the PI, while one CSI report corresponds to one CSI reference resource, where a measurement resource used by the CSI report is no later than the CSI reference resource. In this case, measurement that should have been started on a resource whose time domain location is not later than a time domain location of an existing CSI reference resource actually starts only after PI parsing is completed and the overlapping resource of the first resource and the second resource is learned. As a result, a CSI report obtained based on a resource whose time domain location is not later than a time domain location of the existing CSI reference resource is not sent in a corresponding uplink slot n' in time. Based on this, in this embodiment of this application, the time domain location of the CSI reference resource is defined as the downlink slot (n−N−K), which is advanced by K slots relative to a downlink slot (n−N) in the time domain location of the existing CSI reference resource. Therefore, the CSI report obtained based on the resource whose time domain location is not later than the time domain location of the existing CSI reference resource can be sent in the corresponding uplink slot n' in time.

In a possible design, the terminal device receives third information from the network device, where the third information indicates a value of K; or the terminal device determines the value of K based on processing time of a physical downlink control channel and/or a time domain periodicity of the PI. That is, in this embodiment of this application, the value of K may be determined by the terminal device based on a related parameter and a preset rule, or may be determined by the network device and then sent to the terminal device.

According to a second aspect, a measurement method is provided. A communication apparatus performing the method may be a network device, or may be a module, for example, a chip, used in a network device. The following is described by using an example in which an execution body is a network device. The network device sends first information and second information. The first information indicates a first resource, and the second information indicates a second resource. The network device determines a third resource based on the first resource and the second resource. The third resource includes a part of or all resources in the first resource except a first overlapping resource, and the first overlapping resource is an overlapping resource of the first resource and the second resource. Finally, the network device sends a measurement signal on the third resource, or the network device determines not to send a signal on the third resource. The method is a network side method corresponding to the measurement method provided in the first aspect, and therefore, can also implement beneficial effects that can be implemented by the measurement method provided in the first aspect.

In a possible design, the second information is configuration information of a rate matching resource, and the second resource is the rate matching resource; or the second information is a pre-emption indication PI, and the second resource is a pre-emption resource indicated by the PI.

In a possible design, the third resource is a resource that is in the first resource and that does not overlap a fourth resource, the fourth resource includes a resource in a first frequency domain range and a first time domain symbol of the first resource, the first time domain symbol is a time domain symbol in a time domain resource corresponding to the first overlapping resource, the first frequency domain range includes a frequency domain range in which a second overlapping resource is located, and the second overlapping resource is an overlapping resource in the first time domain symbol of the first overlapping resource.

In a possible design, the fourth resource further includes a resource in the first frequency domain range and a second time domain symbol of the first resource, and the second time domain symbol is a time domain symbol in a time domain code division multiplexing CDM relationship with the second overlapping resource.

In a possible design, when the measurement is broadband measurement, the first frequency domain range is a frequency domain range corresponding to the first resource; or when the measurement is subband measurement, the first frequency domain range is a frequency domain range corresponding to a subband in which the second overlapping resource is located.

In a possible design, a time domain resource of the first resource is not later than a time domain location of a CSI reference resource corresponding to a channel state information CSI report, and the time domain location of the CSI reference resource is a downlink slot (n–N–K) when the second resource is the pre-emption resource indicated by the PI, where $$n = \left\lfloor n' \cdot \frac{2^{\mu_{DL}}}{2^{\mu_{UL}}} \right\rfloor,$$

$\mu_{DL}$ and $\mu_{UL}$ are respectively an index of a downlink subcarrier spacing SCS and an index of an uplink SCS, N is determined based on a parameter in the first information, both N and K are non-negative integers, and n' is a slot index for sending the CSI report.

In a possible design, the network device sends third information to a terminal device. The third information indicates a value of K.

According to a third aspect, a communication apparatus is provided, to implement the foregoing methods. The communication apparatus includes a corresponding module, unit, or means for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided, including a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method according to any one of the foregoing aspects by using a logic circuit or executing code instructions.

In a possible design, the communication apparatus further includes a memory. The memory is configured to store computer instructions. When the processor executes the instructions, the communication apparatus is enabled to perform the method according to any one of the foregoing aspects.

According to a fifth aspect, a communication apparatus is provided, including a processor. The processor is configured to be coupled to a memory; and after reading instructions in the memory, perform the method according to any one of the foregoing aspects based on the instructions.

In a possible design, the communication apparatus further includes a memory. The memory is configured to store program instructions and data that are necessary. When the communication apparatus is a chip system, the communication apparatus may include a chip, or may include a chip and another discrete component.

According to a sixth aspect, a computer-readable storage medium is provided. The computer-readable storage medium stores instructions. When the instructions are executed by a communication apparatus, the communication apparatus is enabled to implement the method according to any one of the foregoing aspects.

According to a seventh aspect, a computer program product including instructions is provided. When the instructions are executed by a communication apparatus, the communication apparatus is enabled to implement the method according to any one of the foregoing aspects.

For technical effects brought by any one of the designs of the third aspect to the seventh aspect, refer to technical effects brought by different designs of the first aspect or the second aspect. Details are not described herein again.

According to an eighth aspect, a communication system is provided. The communication system includes a communication apparatus configured to implement the method according to the first aspect and a communication apparatus configured to perform the method according to the second aspect.

DESCRIPTION OF EMBODIMENTS

Figure 1:
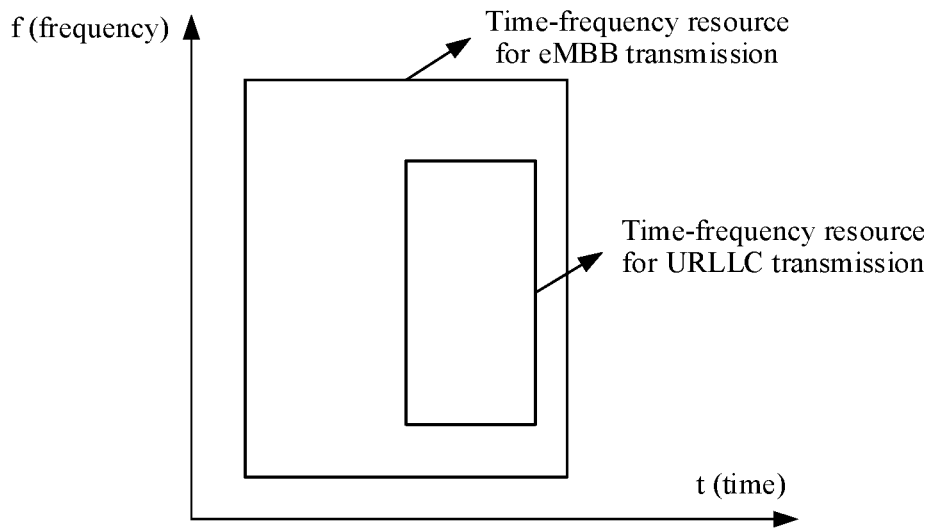
FIG. 1 is a schematic diagram of preemption of URLLC service data in a conventional technology.

For ease of understanding of technical solutions in embodiments of this application, the following first briefly describes technologies or nouns related to this application.

1. Three Application Scenarios of an NR System

Typical eMBB services include an ultra-high-definition video, augmented reality (AR), virtual reality (VR), and the like. These services are mainly characterized by a large data transmission amount and a very high transmission rate. Typical URLLC services include wireless control in an industrial manufacturing or production process, motion control and remote repair of a self-driving car and an unmanned aircraft, a tactile interaction application such as remote surgery, and the like. These services are mainly characterized by ultra-high reliability, a low latency, a small data transmission amount, and burstiness. Typical mMTC services include smart grid distribution automation, smart city, and the like, and are mainly characterized by a huge quantity of network-connected devices, a small data transmission amount, and insensitivity of data to a transmission latency. These services need to satisfy requirements for low costs and very long standby duration.

2. Coexistence of an URLLC Service and an eMBB Service

Due to burstiness and randomness in generation of URLLC service data, no data packet may be generated within a very long period of time, or a plurality of data packets may be generated within a very short period of time. Therefore, a feature of the URLLC service data affects a resource allocation manner of a communication system. Resources herein include but are not limited to a time domain symbol, a frequency domain resource, a time frequency resource, a codeword resource, and a beam resource. Generally, resource allocation of the communication system is completed by a base station. The following uses the base station as an example for description. If the base station allocates a resource to the URLLC service data in a resource reservation manner, a system resource is wasted when there is no URLLC service data. In addition, a low latency feature of a URLLC service requires that data packet transmission be completed within an excessively short period of time. Therefore, the base station needs to reserve abundant bandwidth for the URLLC service data, causing a severe decrease in system resource utilization.

An eMBB service has a large data amount and a high transmission rate. Therefore, a long time scheduling element is usually used for data transmission, to improve transmission efficiency, for example, one slot with a 15 kHz subcarrier spacing that corresponds to 14 time domain symbols and a time length of 1 millisecond (ms). A short time scheduling element is usually used for the URLLC service data, to meet an ultra-low latency requirement, for example, two time domain symbols with a 15 kilohertz (kHz) subcarrier spacing that correspond to a time length of 0.14 ms, or one slot with a 60 kHz subcarrier spacing that corresponds to 14 time domain symbols and a time length of 0.25 ms.

Due to burstiness of the URLLC service data, to improve system resource utilization, the base station usually reserves no resource for downlink data transmission of the URLLC service. When the URLLC service data arrives at the base station, if there is no idle time-frequency resource, to meet an ultra-short latency requirement of the URLLC service, the base station cannot schedule the URLLC service data after currently scheduled eMBB service data is transmitted. The base station may allocate a resource to the URLLC service data through pre-emption. As shown in FIG. 1, the preemption herein means that the base station selects a part of or all time-frequency resources that have been allocated to transmit eMBB service data, to transmit the URLLC service data. Certainly, the base station does not send the eMBB service data on the time-frequency resource for transmitting the URLLC service data.

It should be noted that the time domain symbol in embodiments of this application may also be a symbol for short. For example, the symbol may be an orthogonal frequency division multiplexing (OFDM) symbol in a long term evolution (LTE) system or an NR system, a discrete Fourier transform spread OFDM (DFT-s-OFDM) symbol, another symbol in a future mobile communication system, or the like. Unless otherwise specified, symbols in embodiments of this application are all time-domain symbols.

3. Pre-Emption Indication (PI)

An eMBB service data resource may be preempted by a burst URLLC service data resource. If a terminal device that receives the eMBB service data does not know that a data resource of the terminal device is preempted, the terminal device may treat the URLLC service data as its own data for demodulation and decoding. As a result, the decoding fails. More seriously, for a transport block that fails to be decoded, the terminal device stores a soft value that is interfered with by URLLC, and combines and decodes the stored soft value and a soft value of to-be-retransmitted data. As a result, a decoding error occurs during retransmission. A PI is introduced to an NR system, to resolve this problem. The PI is carried in common downlink control information (DCI), and is represented by using a 14-bit bitmap. The bitmap indicates one or more frequency domain parts (N≥1) and/or one or more time domain parts (M≥1), and a value of {M, N} may be {14, 1} or {7, 2}. That is, the time-frequency resource is first divided into blocks, and the block is known to both the base station and the terminal device. Then, the base station sends a PI in a bitmap form, to notify the terminal device of whether each resource block is preempted by the URLLC service data.

Figure 2:
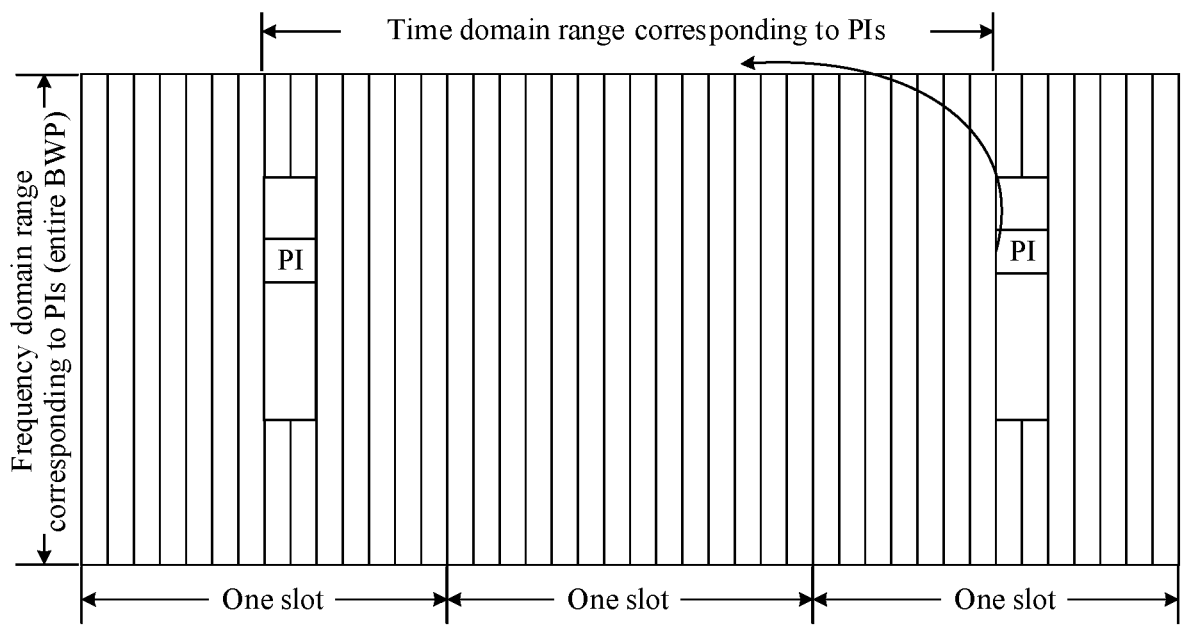
FIG. 2 is a schematic diagram 1 of a location of a time-frequency resource indicated by a PI in a conventional technology.
Figure 3:
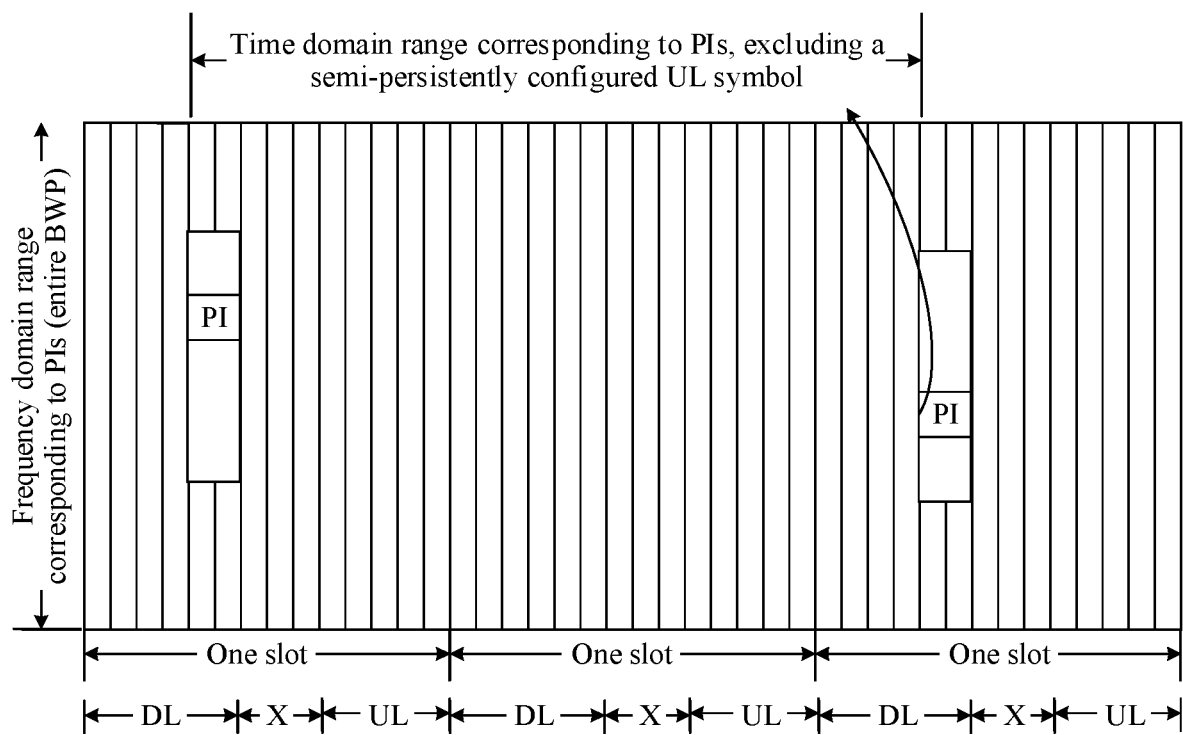
FIG. 3 is a schematic diagram 2 of a location of a time-frequency resource indicated by a PI in a conventional technology.

Currently, a sending periodicity of the DCI carrying the PI is configured by a higher layer parameter in a unit of a slot. If the sending periodicity of the DCI carrying the PI is $T_{INT}$ slots, a time-frequency range indicated by each 14-bit PI includes:

all resource blocks (RB) of an entire activated bandwidth part (BWP) in frequency domain, which are denoted as $B_{INT}$ RBs; and $N_{INT}$ time domain symbols in time domain. The $N_{INT}$ time domain symbols are $N_{symb}^{slot} \cdot T_{INT} \cdot 2^{\mu-\mu_{INT}}$ time domain symbols before the 1$^{st}$ time domain symbol of a physical downlink control channel (PDCCH) corresponding to the DCI carrying the PI. $T_{INT}$ is the PI check periodicity configured by a higher layer, $N_{symb}^{slot}$ is a quantity of symbols of each slot, $\mu_{INT}$ is a subcarrier spacing index corresponding to a BWP for receiving DCI by the terminal device, and μ is a subcarrier spacing index corresponding to an active BWP in a serving cell to which the PI is applied. In addition, in the case of a time division duplex (TDD) configuration, a value of $N_{INT}$ is obtained by subtracting, from $N_{symb}^{slot} \cdot T_{INT} \cdot 2^{\mu-\mu_{INT}}$, a quantity of UL time domain symbols indicated in higher layer signaling TDD-UL-DL-configuration common or TDD-UL-DL-configuration common. For example, as shown in FIG. 2, a frequency domain range indicated by a PI is an entire BWP, and $N_{INT}$ time domain symbols indicated by the PI are 28 time domain symbols. For another example, for a TDD configuration, as shown in FIG. 3, a frequency domain range indicated by a PI is an entire BWP, and $N_{INT}$ time domain symbols indicated by the PI are 18 time domain symbols.

Currently, according to higher layer parameter configuration, there are two division manners for the time-frequency resource corresponding to the PI, and time-frequency sub-resources corresponding to all of 14 bits are different from each other. In a possible manner, the time-frequency block is divided into 14 parts in time domain, and is not divided in frequency domain. The time-frequency block corresponds to {14, 1}. For a 14-bit PI, each bit corresponds to one time-frequency sub-resource. In another possible manner, the time-frequency block is divided into seven parts in time domain, and is equally divided into two parts in frequency domain. The time-frequency block corresponds to {7, 2}. For a 14-bit PI, every two bits are grouped into one group, and there are a total of seven groups. A bit value 0 in the bitmap indicates that there may be transmission of the user on the time-frequency resource (which may also be understood as that the time-frequency resource is not pre-empted by URLLC data resource); and a bit value 1 indicates that there is no transmission of the user on the time-frequency resource.

4. Resources that are Unavailable for Sending a PDSCH

In an NR system, some resources unavailable for sending a PDSCH are defined, and are referred to as rate matching resources. These resources may be for forward or backward compatibility of the NR system. For example, some resources are periodically allocated in NR resources to a future system or a function for use. If these resources overlap a PDSCH time-frequency resource block determined based on the DCI, the overlapping resource is not used to transmit the PDSCH. Currently, resources that are defined in the NR system and that are unavailable for sending a PDSCH are classified into three types: an RB symbol-level resource, a resource element (RE)-level resource, and a synchronization signal (SS)/physical broadcast channel (PBCH) block (SSB) resource. The following embodiment of this application is mainly described with reference to an RB symbol-level resource. Unified description is provided herein and details are described in the following.

Figure 4:
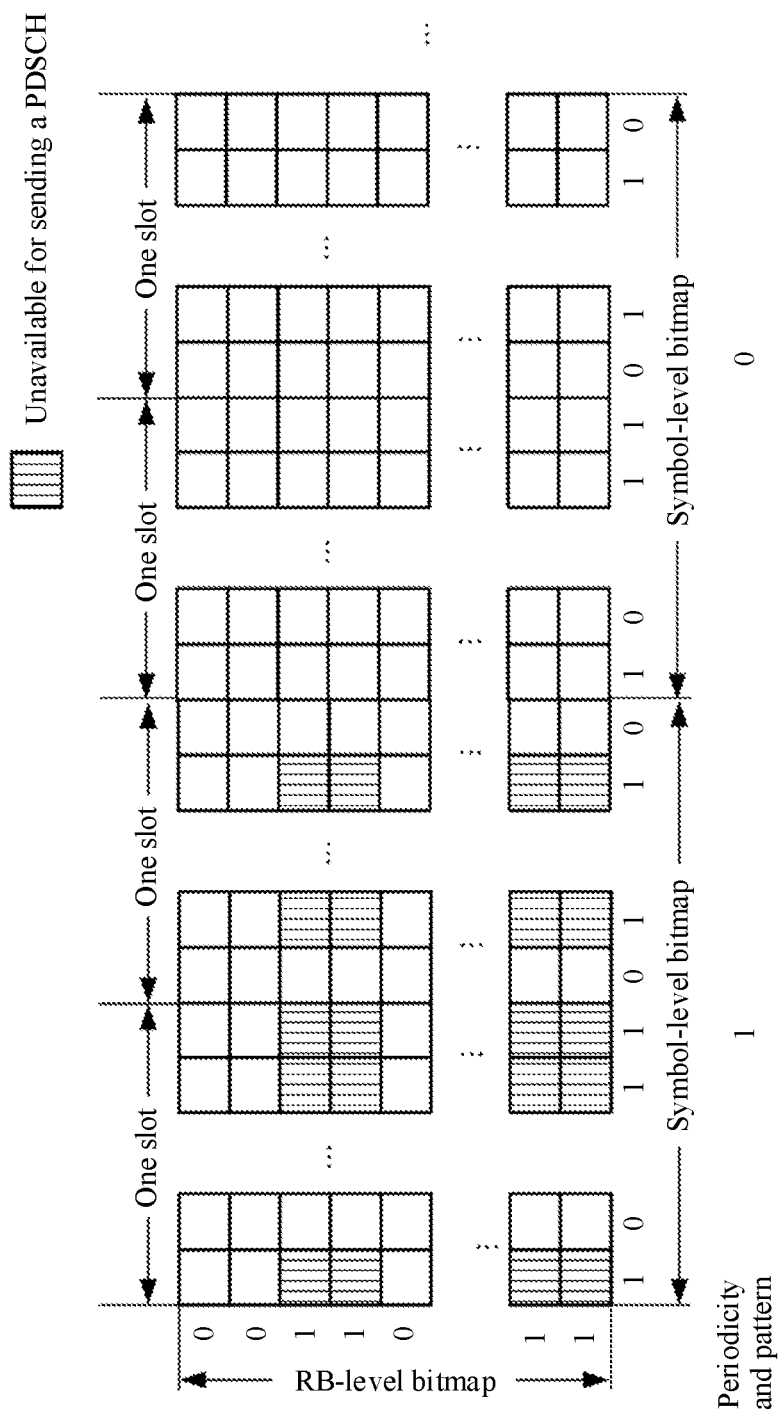
FIG. 4 is a schematic diagram of a rate matching pattern in a conventional technology.

For an RB symbol-level resource unavailable for sending a PDSCH, a maximum of four BWP-level rate matching patterns may be configured for each BWP of one terminal device, and a maximum of four cell-level rate matching patterns may be configured for each serving cell. Currently, one rate match pattern may include: a pair of reserved resources configured by a network device, where the pair of reserved resources includes one RB-level bitmap and one symbol-level bitmap whose length is two slots. If a value of a bit in the RB-level bitmap and a value of a bit in the symbol-level bitmap are 1, it indicates that corresponding resources are unavailable for sending the PDSCH. A periodicity and pattern may be configured for each pair of RB-level bitmap and symbol-level bitmap, and each bit in the periodicity and pattern corresponds to one symbol-level bitmap. If a value of a bit in the periodicity and pattern is 1, it indicates that the element has a pair of reserved resources. For example, if the periodicity and pattern is 10, the RB-level bitmap is 00110 . . . 11, and the symbol-level bitmap is 10 . . . 11 01 . . . 10, FIG. 4 may show locations of corresponding resources unavailable for sending the PDSCH.

It should be noted that, in embodiments of this application, a time unit including 12 OFDM symbols or 14 OFDM symbols is referred to as a subframe in an LTE system and corresponds to two slots, and corresponds to one slot in an NR system. Slots in the following embodiments of this application are described by using a slot in the NR system as an example.

5. CSI-RS

A CSI-RS is configured in an NR system. Currently, CSI-RSs are classified into a zero power (ZP) CSI-RS and an NZP CSI-RS. The NZP CSI-RS is sent at an NZP CSI-RS resource location to perform CSI measurement, layer 1 (L1)-reference signal received power (RSRP) measurement, time-frequency tracking, mobility measurement, radio link detection, and the like. No CSI-RS is sent at a ZP CSI-RS resource location, and the ZP CSI-RS resource location is mainly for rate matching for the PDSCH. The PDSCH is mapped to a location other than the ZP CSI-RS location, avoiding interference from another terminal device or another cell and interference with a signal of the another terminal device or the another cell.

Currently, there are three types of CSI-RS resources: periodic, semi-persistent, and aperiodic resources. The periodic resource is configured via radio resource control (RRC) signaling, and then is periodically sent. The semi-persistent resource is configured via RRC signaling, activated and deactivated via medium access control-control element (MAC-CE) signaling, and is periodically sent in an activated state. The aperiodic resource is configured via RRC signaling, and is triggered by DCI at a physical layer.

The following describes CSI-RS resource mapping.

For the periodic or semi-persistent CSI-RS, a periodicity and an offset are configured using a higher layer parameter in a unit of a slot. After the periodic CSI-RS is configured or the semi-persistent CSI-RS is activated, the terminal device determines, based on the periodicity and the offset, a slot in which the CSI-RS is located. For the aperiodic CSI-RS, the terminal device may determine, based on the triggering DCI, a slot in which the CSI-RS is located. Further, in a slot in which there is a CSI-RS resource, there may be one or two groups of CSI-RS resources in time domain according to a higher layer configuration, and each group includes one OFDM symbol or two consecutive OFDM symbols. The two groups of CSI-RS resources may be adjacent or separated by several OFDM symbols.

In frequency domain, a frequency domain range of the CSI-RS is configured via higher layer signaling to be a plurality of consecutive physical resource blocks (PRB).

Each PRB or one out of every two PRBs includes a CSI-RS resource. On one PRB, in an OFDM symbol in which the CSI-RS resource is located, an RE in which the CSI-RS resource is located is determined based on a quantity of antenna ports configured by a higher layer, a code division multiplexing (CDM) type, and the like. Currently, there are four CDM types of the CSI-RS configured by the higher layer: noCDM, fd-CDM2, cdm4-FD2-TD2, and cdm8-FD2-TD4. noCDM indicates that no CDM is performed on the CSI-RS. fd-CDM2 indicates that code allocation is performed on the CSI-RS on two consecutive subcarriers in frequency domain with a code length of 2. cdm4-FD2-TD2 indicates that code allocation is performed on the CSI-RS on two consecutive subcarriers in frequency domain with a code length of 2 and two consecutive time domain symbols in time domain with a code length of 2. cdm8-FD2-TD4 indicates that code allocation is performed on the CSI-RS on two consecutive subcarriers in frequency domain with a code length of 2 and four consecutive time domain symbols in time domain with a code length of 4.

In CSI-RS resource mapping, N antenna ports perform CDM transmission on N REs. Each antenna port corresponds to one CDM N orthogonal code. After a CSI-RS signal corresponding to each antenna is multiplied by the orthogonal code, N signals are obtained and transmitted on the N REs. That is, if a signal transmitted on each RE is a superposed signal obtained by performing orthogonal code processing on CSI-RS signals of the N antenna ports, the receive end can process the signals from the N REs only after receiving all of the signals, to obtain the N CSI-RSs corresponding to the N antenna ports.

The following describes several examples in figures. In the figures, a horizontal axis is a time axis, including 14 OFDM symbols in one slot, and a vertical axis is a frequency domain axis, including 12 subcarriers in one PRB.

Figure 5:
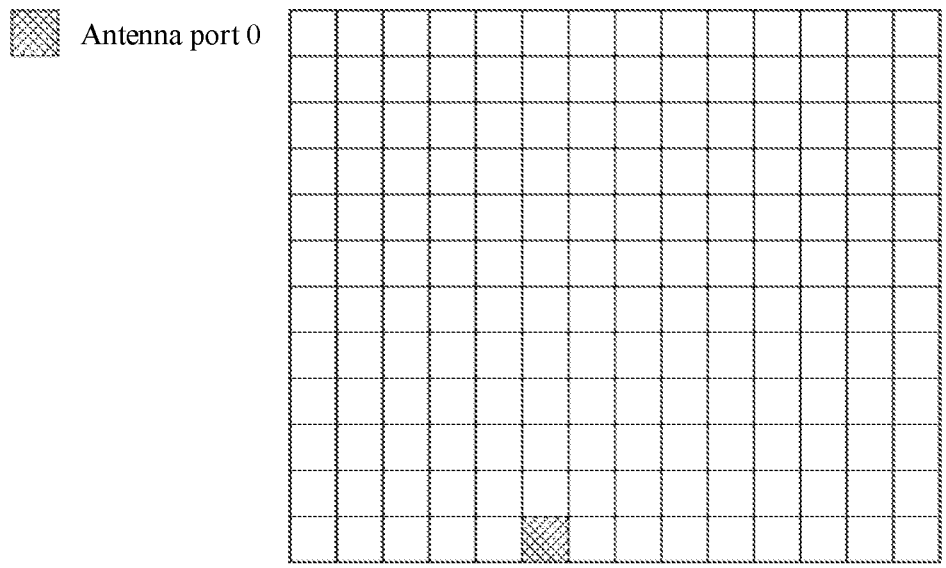
FIG. 5 is a schematic diagram 1 of CSI-RS resource mapping in a conventional technology.

Example 1: As shown in FIG. 5, one group of CSI-RS resources is included in time domain. The group of CSI-RS resources includes one OFDM symbol, a quantity of antenna ports is 1, and a CDM type is noCDM.

Figure 6:
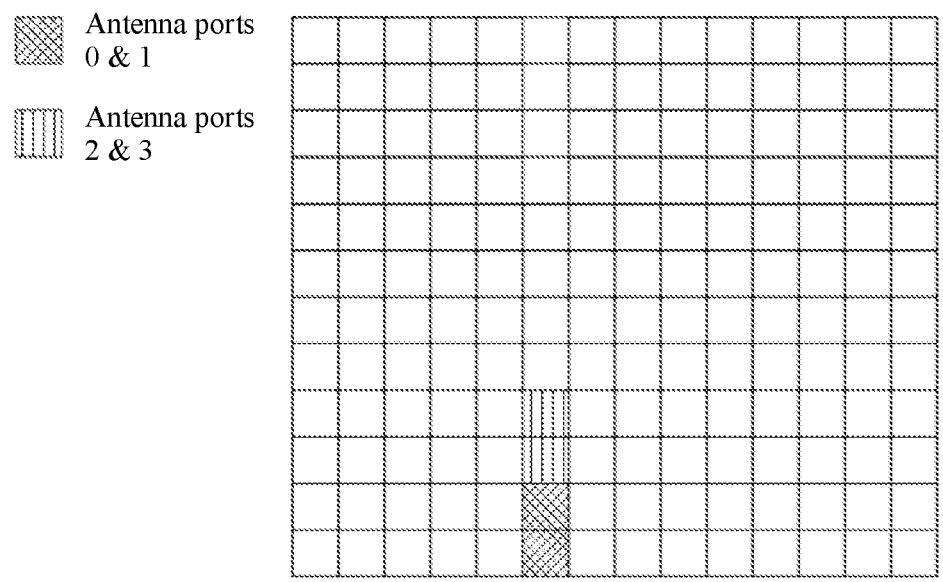
FIG. 6 is a schematic diagram 2 of CSI-RS resource mapping in a conventional technology.

Example 2: As shown in FIG. 6, a quantity of antenna ports is 4, and a CDM type is fd-CDM2.

Figure 7:
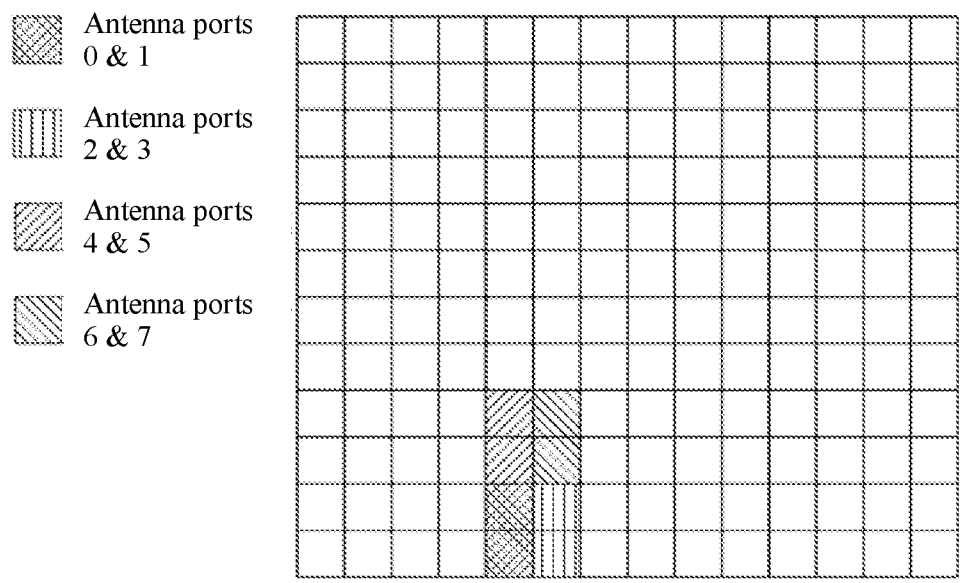
FIG. 7 is a schematic diagram 3 of CSI-RS resource mapping in a conventional technology.

Example 3: As shown in FIG. 7, a quantity of antenna ports is 8, and a CDM type is fd-CDM2.

Figure 8:
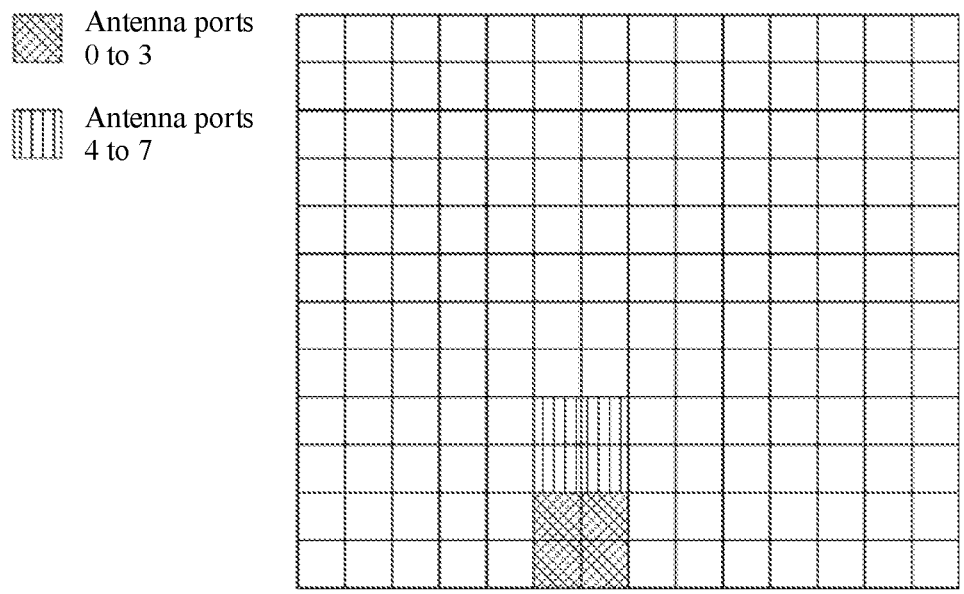
FIG. 8 is a schematic diagram 4 of CSI-RS resource mapping in a conventional technology.

Example 4: As shown in FIG. 8, a quantity of antenna ports is 8, and a CDM type is cdm4-FD2-TD2.

Figure 9:
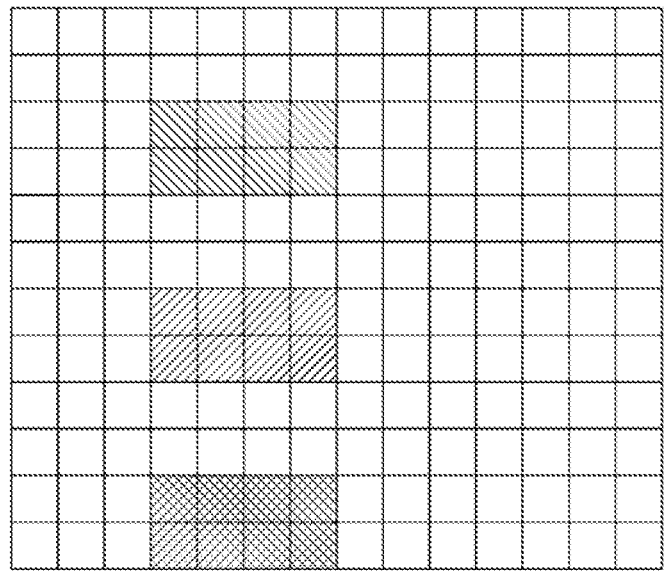
FIG. 9 is a schematic diagram 5 of CSI-RS resource mapping in a conventional technology.

Example 5: As shown in FIG. 9, a quantity of antenna ports is 24, and a CDM type is cdm8-FD2-TD4.

6. CSI-IM

In an NR system, CSI-IM resources are configured for a terminal device. For a terminal device, no wanted signal is sent to the terminal device on the CSI-IM resources, and the terminal device may measure interference on these resources.

Currently, there are three types of CSI-IM resources: periodic, semi-persistent, and aperiodic resources. The periodic resource is configured via RRC signaling, and then is periodically sent. The semi-persistent resource is configured via RRC signaling, activated and deactivated by using MAC-CE signaling, and periodically transmitted in an activated state. The aperiodic resource is configured via RRC signaling, and is triggered by DCI at a physical layer.

The following describes CSI-IM resource mapping.

For the periodic or semi-persistent CSI-IM, a periodicity and an offset are configured using a higher layer parameter in a unit of a slot. After the periodic CSI-IM is configured or the semi-persistent CSI-IM is activated, the terminal device determines, based on the periodicity and the offset, a slot in which the CSI-IM is located. For the aperiodic CSI-IM, the terminal device may determine, based on the trigger DCI, a slot in which the CSI-IM is located. Further, in a slot in which there is a CSI-IM resource, in frequency domain, a frequency domain range of the CSI-IM configured via higher layer signaling is a plurality of consecutive PRBs, and each PRB includes a CSI-IM resource.

In time domain, one CSI-IM resource includes four REs in one slot. The four REs may be four REs corresponding to an OFDM symbol and four consecutive subcarriers, or may be four REs corresponding to two consecutive subcarriers and two consecutive OFDM symbols. The UE may determine, based on the higher layer signaling configuration, locations of the four REs in the PRB including the CSI-IM.

7. CSI Measurement and CSI Reporting

First, a relationship between a CSI report type and a measurement resource type is described as follows.

Based on a measurement configuration of a base station, a terminal device performs channel measurement and/or interference measurement based on an NZP CSI-RS, performs interference measurement through CSI-IM, generates different types of CSI based on higher layer indications, and performs reporting.

Currently, CSI reports can be classified into the following types: a periodic report, a semi-persistent report, and an aperiodic report. The CSI report may be carried on a physical uplink control channel (PUCCH), or may be carried on a physical uplink shared channel (PUSCH). The following provides related descriptions of broadband and subband measurement.

A terminal device performs some measurement and reporting in two modes: a broadband mode and a subband mode.

During subband measurement, a nominal subband size is related to a BWP bandwidth. Each BWP bandwidth may correspond to two subband sizes (as shown in Table 1), and a higher layer configuration may indicate one of the subband sizes.

TABLE 1

| BWP (PRBs) | Subband size (PRBs) |
| --- | --- |
| <24 | N/A |
| 24-72 | 4, 8 |
| 73-144 | 8, 16 |
| 145-275 | 16, 32 |

The following provides related descriptions of a CSI reference resource.

A CSI reference resource of one serving cell is defined as follows.

In frequency domain, the CSI reference resource is defined as one group of downlink PRBs, corresponding to a related bandwidth for generating CSI.

In time domain, one CSI reference resource for CSI reporting in an uplink slot n' is defined as a downlink slot (n−N), where $$n = \left\lfloor n' \cdot \frac{2^{\mu_{DL}}}{2^{\mu_{UL}}} \right\rfloor,$$

$\mu_{DL}$ and $\mu_{UL}$ are respectively an index of a downlink subcarrier spacing (SCS) and an index of an uplink SCS, N is determined by a higher layer parameter such as a CSI report type, and N is a non-negative integer.

Figure 10:
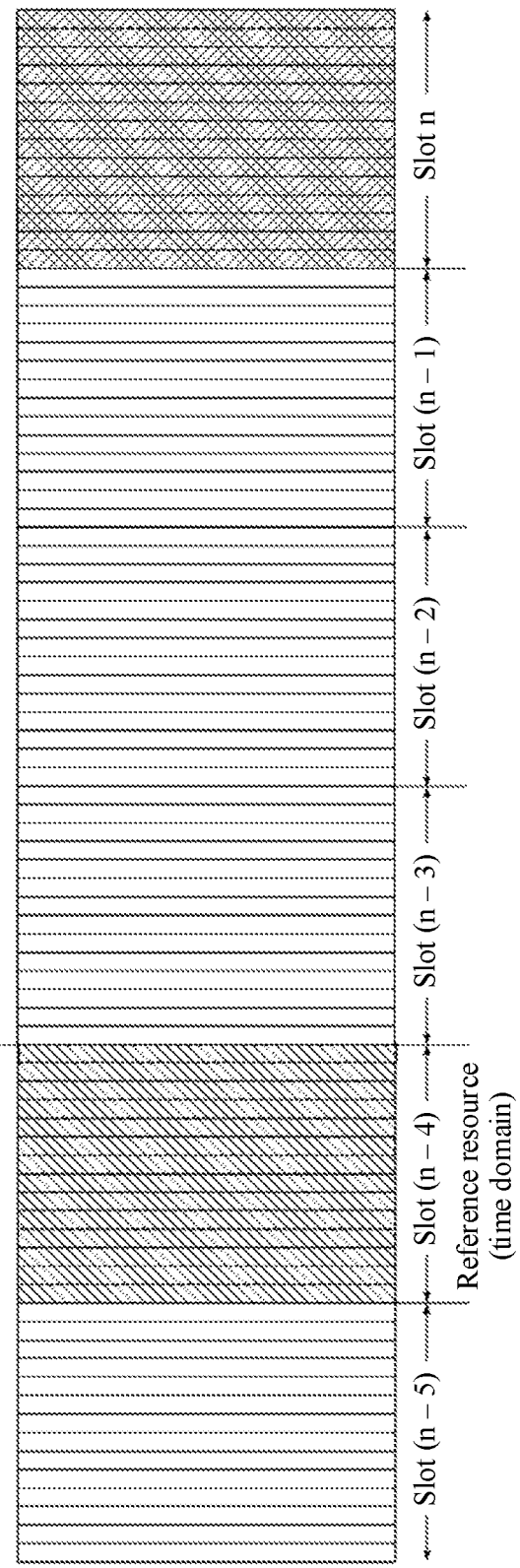
FIG. 10 is a schematic diagram of a location of a CSI reference resource in a conventional technology.

For example, if N is four slots, FIG. 10 may be a schematic diagram of a location of a CSI reference resource of one serving cell.

If no higher layer parameter "time restriction for channel measurement" is configured for a terminal device, the terminal device performs channel measurement based on an NZP CSI-RS that is in the CSI resource configuration and that is not later than the CSI reference resource, to obtain the CSI reported in the uplink slot n'; if a higher layer parameter "time restriction for channel measurement" has been configured for a terminal device, the terminal device performs channel measurement based on a nearest NZP CSI-RS that is in the CSI resource configuration and that is not later than the CSI reference resource, to obtain the CSI reported in the uplink slot n'.

If no higher layer parameter "time restriction for channel measurement" is configured for a terminal device, the terminal device performs interference measurement based on CSI-IM and/or an NZP CSI-RS that are or is in the CSI resource configuration and that are or is not later than the CSI reference resource, to obtain the CSI reported in the uplink slot n'; if a higher layer parameter "time restriction for channel measurement" has been configured for a terminal device, the terminal device performs channel measurement based on CSI-IM and/or an NZP CSI-RS that are or is in the CSI resource configuration and that are or is not later than the CSI reference resource, to obtain the CSI reported in the uplink slot n'.

8. PDSCH and NZP CSI-RS

In an NR system, if a cyclic redundancy check (CRC) of a PDCCH for scheduling a PDSCH is scrambled using a cell radio network temporary identifier (C-RNTI), a modulation and coding scheme (MCS)-C-RNTI, and a configured scheduling radio network temporary identifier (CS-RNTI), or the PDSCH is a semi-persistent scheduling (SPS) PDSCH, in a possible implementation, when a PDSCH resource overlaps an NZP CSI-RS, for an aperiodic NZP CSI-RS, the PDSCH does not perform rate matching on the overlapping resource;

for an NZP CSI-RS configured with a higher layer parameter CSI-RS-Resource-Mobility, the PDSCH does not perform rate matching on the overlapping resource; and in other scenarios, the PDSCH performs rate matching on the NZP CSI-RS.

In another possible implementation, when the PDSCH resource overlaps the ZP CSI-RS, for an aperiodic ZP CSI-RS that is not triggered by a scheduling PDCCH of the PDSCH, the PDSCH does not perform rate matching on the overlapping resource; otherwise, in other scenarios, the PDSCH performs rate matching on the ZP CSI-RS.

It should be noted that the NZP CSI-RS and ZP CSI-RS discussed above are a configured periodic NZP CSI-RS and ZP CSI-RS, an activated SP NZP CSI-RS and SP ZP CSI-RS, or a triggered aperiodic NZP CSI-RS and an aperiodic ZP CSI-RS, and does not include an unactivated SP NZP CSI-RS or SP ZP CSI-RS, or a triggered aperiodic NZP CSI-RS or aperiodic ZP CSI-RS. Unified description is provided herein and details are described in the following.

It may be understood that, in embodiments of this application, the PDCCH, the PDSCH, the PUCCH, and the PUSCH are merely examples of a downlink control channel, a downlink data channel, an uplink control channel, and an uplink data channel. The downlink control channel, the downlink data channel, the uplink control channel, and the uplink data channel may have different names in different communication systems. This is not limited in embodiments of this application.

The following describes the technical solutions in embodiments of this application with reference to the accompanying drawings of embodiments of this application.

Embodiments of this application are applicable to an LTE system or an NR system, or are applicable to another future-oriented new system, or the like. This is not specifically limited in embodiments of this application. In addition, the terms "system" and "network" are interchangeable.

Figure 11:
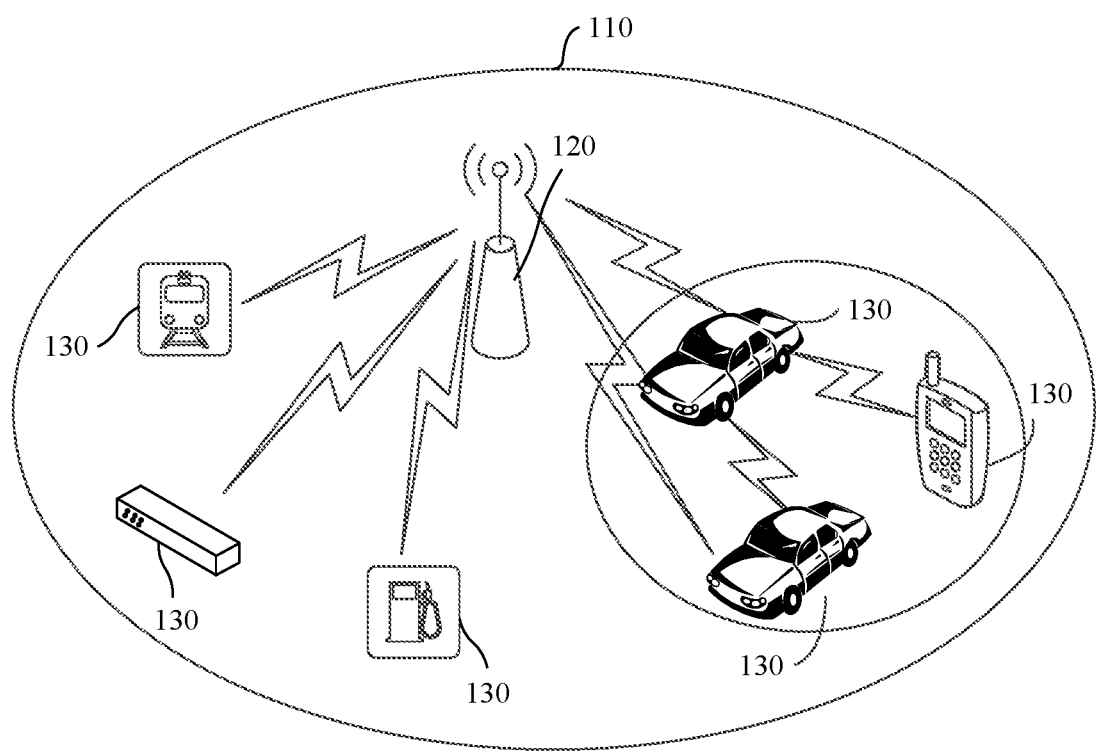
FIG. 11 is a schematic diagram of an architecture of a communication system according to an embodiment of this application.

FIG. 11 shows a communication system 110 according to an embodiment of this application. The communication system 110 includes a network device 120, and one or more terminal devices 130 connected to the network device 120. The terminal device 130 is connected to the network device 120 in a wireless manner. Optionally, different terminal devices 130 may communicate with each other. The terminal device 130 may be at a fixed location, or may be movable.

It should be noted that FIG. 11 is merely a schematic diagram. The communication system 110 may further include another network device, for example, one or more of a core network device, a wireless relay device, and a wireless backhaul device though they are not shown in FIG. 11. This is not specifically limited herein. The network device may be connected to the core network device in a wireless or wired manner. The core network device and the network device 120 may be different independent physical devices, or functions of the core network device and logical functions of the network device 120 may be integrated into a same physical device, or a part of functions of the core network device and a part of functions of the network device 120 may be integrated into one physical device. This is not specifically limited in this embodiment of this application.

For example, the network device 120 shown in FIG. 11 interacts with any terminal device 130. In this embodiment of this application, the network device 120 may send first information to the terminal device 130. The terminal device 130 receives the first information from the network device 120, and determines first resource based on the first information. The network device 120 may further send second information to the terminal device 130. The terminal device 130 receives the second information from the network device 120, and determines second resource based on the second information. Further, the terminal device 130 determines the third resource based on the first resource and the second resource, and performs measurement on the third resource. Specific implementations of this solution are described in subsequent method embodiments. Details are not described herein. Based on this solution, the terminal device in this embodiment of this application performs measurement on a part of or all resources in the first resource except a first overlapping resource. In other words, the terminal device does not perform measurement on the overlapping resource of the first resource and the second resource, or the terminal device performs measurement neither on the overlapping resource of the first resource and the second resource nor on a related resource of the overlapping resource. Therefore, measurement performance degradation caused by interference from another signal on the measurement resource can be avoided.

Optionally, the network device 120 in this embodiment of this application is a device connecting the terminal device 130 to a wireless network. The network device 120 may be a base station, an evolved NodeB (eNodeB), a transmission reception point (TRP), a next generation base station (gNB) in a 5G mobile communication system, a base station in a future mobile communication system, an access node in a wireless fidelity (Wi-Fi) system, or the like; or may be a module or unit that completes a part of functions of the base station, for example, may be a centralized unit (CU), or may be a distributed unit (DU). A specific technology and a specific device form that are used by the network device are not limited in embodiments of this application. In this application, unless otherwise specified, the network device is a radio access network device.

Optionally, the terminal device 130 in this embodiment of this application may be a device configured to implement a wireless communication function, such as a terminal or a chip that may be used in a terminal. The terminal may also be referred to as user equipment (UE), a mobile station, a mobile terminal, or the like. The terminal may be a mobile phone, a tablet computer, a computer having a wireless transceiver function, a virtual reality terminal device, an augmented reality terminal device, a wireless terminal in industrial control, a wireless terminal in self driving, a wireless terminal in remote surgery, a wireless terminal in smart grid, a wireless terminal in transportation safety, a wireless terminal in smart city, a wireless terminal in smart home, or the like. A specific technology and a specific device form used by the terminal device are not limited in embodiments of this application.

Optionally, the network device 120 and the terminal device 130 in this embodiment of this application may be deployed on land, including indoor, outdoor, handheld, or vehicle-mounted devices; may be deployed on the water; or may be deployed on airplanes, balloons and satellites in the air. Application scenarios of the network device 120 and the terminal device 130 are not limited in embodiments of this application.

Optionally, the network device 120 and the terminal device 130 in this embodiment of this application may communicate with each other by using a licensed spectrum, may communicate with each other by using an unlicensed spectrum, or may communicate with each other by using both a licensed spectrum and an unlicensed spectrum. The network device 120 and the terminal device 130 may communicate with each other by using a spectrum below 6 gigahertz (GHz), a spectrum above 6 GHz, or both a spectrum below 6 GHz and a spectrum above 6 GHz. A spectrum resource used between the network device 120 and the terminal device 130 is not limited in embodiments of this application.

Optionally, the network device 120 and the terminal device 130 in this embodiment of this application may also be referred to as communication apparatuses, and each may be a general-purpose device or a dedicated device. This is not specifically limited in embodiments of this application.

Figure 12:
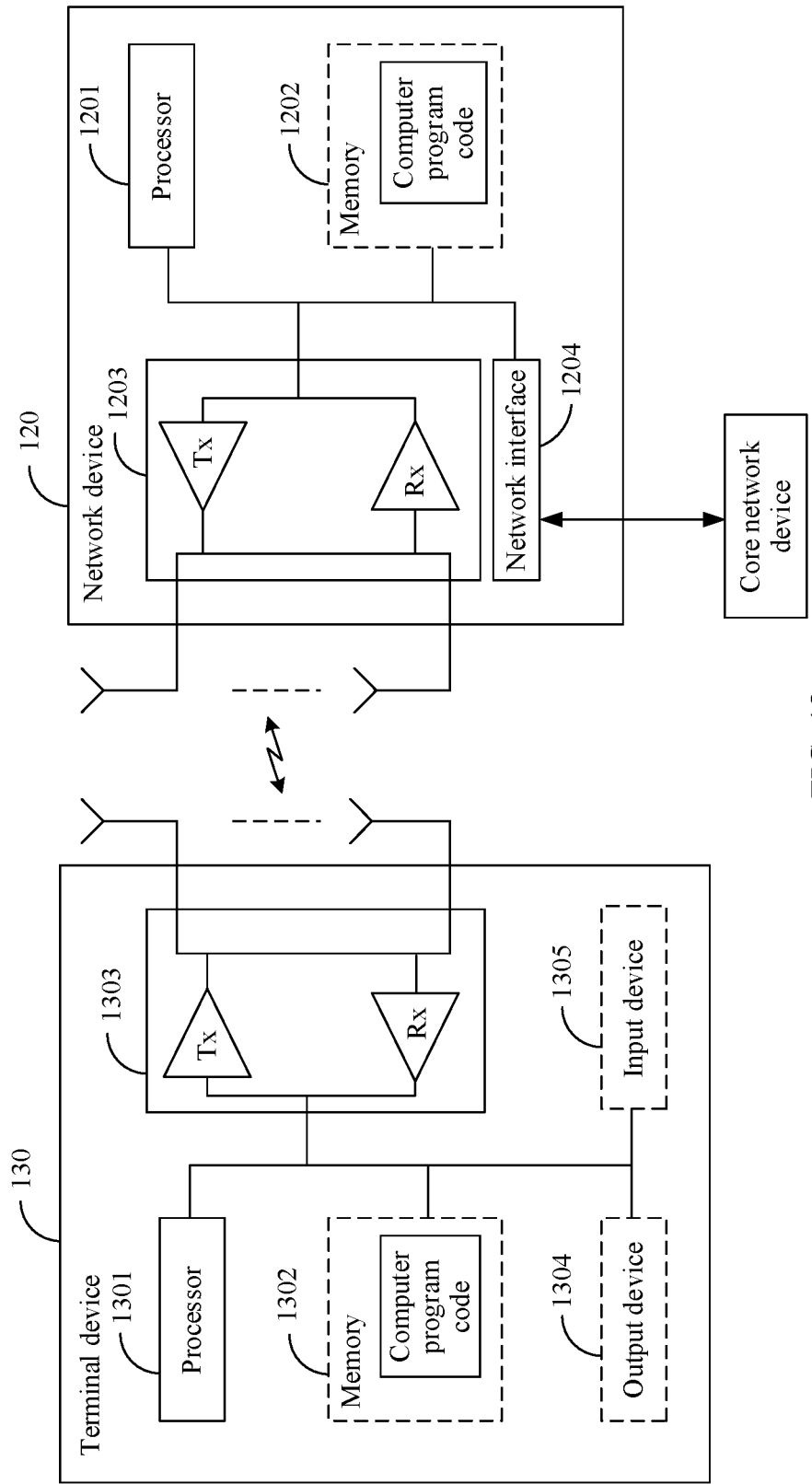
FIG. 12 is a schematic diagram of structures of a terminal device and a network device according to an embodiment of this application.

Optionally, FIG. 12 is a schematic diagram of structures of a network device 120 and a terminal device 130 according to an embodiment of this application.

The terminal device 130 includes at least one processor 1301 and at least one transceiver 1303. Optionally, the terminal device 130 may further include at least one memory 1302, at least one output device 1304, or at least one input device 1305.

The processor 1301, the memory 1302, and the transceiver 1303 are connected through communication lines. The communication line may include a path transmitting information between the foregoing components.

The processor 1301 may be a general-purpose central processing unit (CPU), another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any conventional processor. In specific implementation, in an embodiment, the processor 1301 may also include a plurality of CPUs, and the processor 1301 may be a single-core processor or a multi-core processor. The processor herein may be one or more devices, circuits or processing cores configured to process data.

The memory 1302 may be an apparatus having a storage function. For example, the memory 1302 may be a read-only memory (ROM), another type of static storage device that can store static information and instructions, a random access memory (RAM), or another type of dynamic storage device that can store information and instructions; or may be a programmable read-only memory (PROM), an erasable programmable read-only memory (EPROM), an electrically erasable programmable read-only memory (EEPROM), a compact disc read-only memory (CD-ROM) or another optical disk storage, an optical disc storage (including a compact disc, a laser disc, an optical disc, a digital versatile disc, a Blu-ray disc, or the like), a disk storage medium or another disk storage device, or any other medium that can be used to carry or store expected program code in an instruction or data structure form and that can be accessed by a computer. However, this does not constitute a limitation herein. The memory 1302 may exist independently, and is connected to the processor 1301 through a communication line. Alternatively, the memory 1302 may be integrated with the processor 1301.

The memory 1302 is configured to store computer-executable instructions for performing the solutions in this application, and the computer-executable instructions are executed under control of the processor 1301. Specifically, the processor 1301 is configured to execute the computer-executable instructions stored in the memory 1302, to implement the measurement method in embodiments of this application.

Alternatively, optionally, in this embodiment of this application, the processor 1301 may execute a processing-related function in the communication method according to the following embodiments of this application, and the transceiver 1303 is responsible for communication with another device or communication network. This is not specifically limited in this embodiment of this application.

Optionally, the computer-executable instructions in this embodiment of this application may also be referred to as application program code or computer program code. This is not specifically limited in this embodiment of this application.

The transceiver 1303 may be any type of apparatus using a transceiver, and is configured to communicate with another device or communication network, for example, the Ethernet, a radio access network (RAN), or a wireless local area network (WLAN). The transceiver 1303 includes a transmitter (Tx) and a receiver (Rx).

The output device 1304 communicates with the processor 1301, and may display information in a plurality of manners. For example, the output device 1304 may be a liquid crystal display (LCD), a light emitting diode (LED) display device, a cathode ray tube (CRT) display device, a projector, or the like.

The input device 1305 communicates with the processor 1301, and may receive user input in a plurality of manners. For example, the input device 1305 may be a mouse, a keyboard, a touchscreen device, a sensor device, or the like.

The network device 120 includes at least one processor 1201, at least one transceiver 1203, and at least one network interface 1204. Optionally, the network device 120 may further include at least one memory 1202. The processor 1201, the memory 1202, the transceiver 1203, and the network interface 1204 are connected through communication lines. The network interface 1204 is configured to connect to a core network device through a link (for example, an S1 interface), or connect to a network interface of another network device through a wired or wireless link (for example, an X2 interface) (not shown in FIG. 12). This is not specifically limited in this embodiment of this application. In addition, for related descriptions of the processor 1201, the memory 1202, and the transceiver 1203, refer to descriptions of the processor 1301, the memory 1302, and the transceiver 1303 in the terminal device 130. Details are not described herein again.

Figure 13:
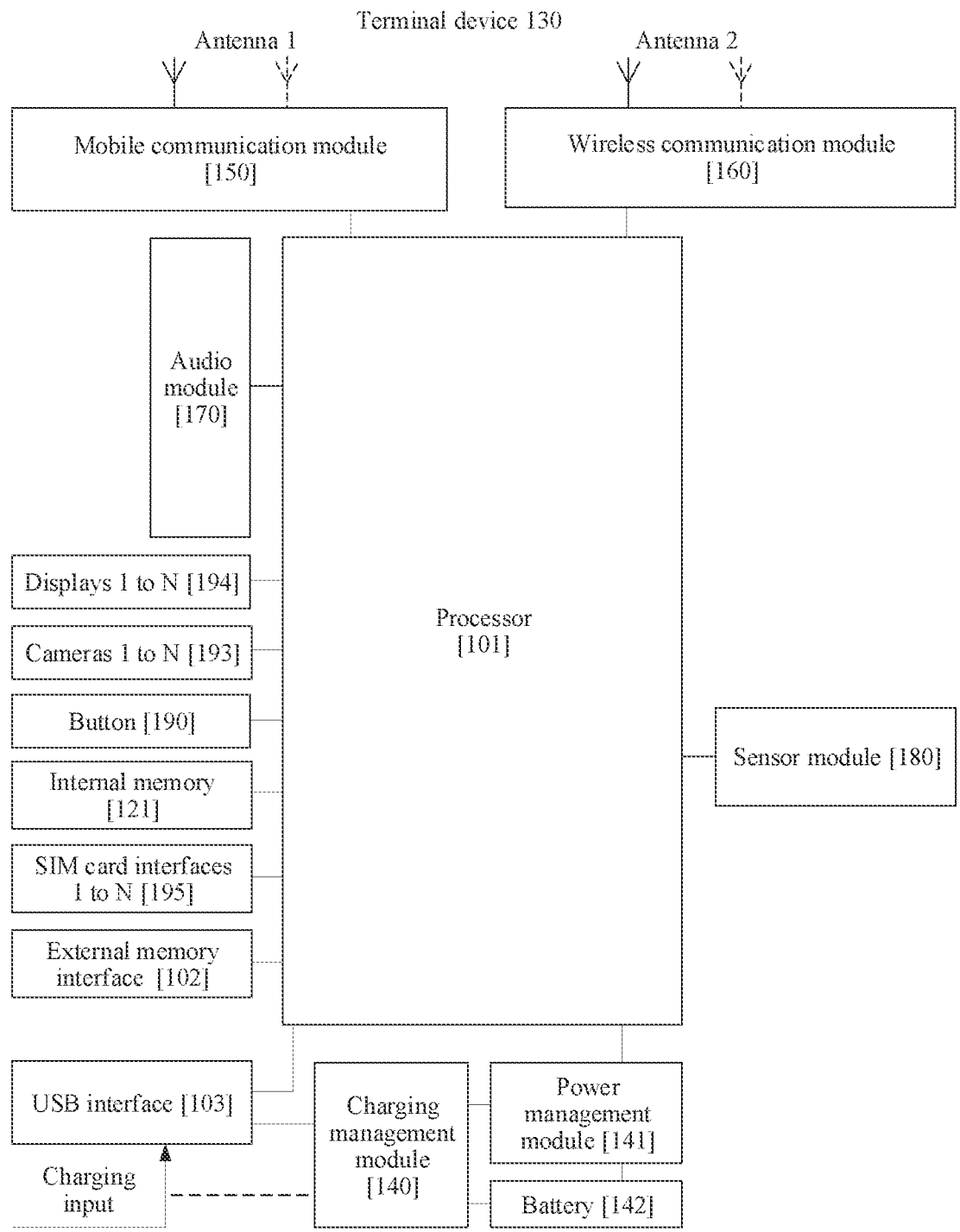
FIG. 13 is a schematic diagram of another structure of a terminal device according to an embodiment of this application.

With reference to the schematic diagram of the structure of the terminal device 130 shown in FIG. 12, for example, FIG. 13 shows a specific structure form of the terminal device 130 according to an embodiment of this application.

In some embodiments, functions of the processor 1301 in FIG. 12 may be implemented by using a processor 101 in FIG. 13.

In some embodiments, functions of the transceiver 1303 in FIG. 12 may be implemented by using an antenna 1, an antenna 2, a mobile communication module 150, a wireless communication module 160, and the like in FIG. 13. The mobile communication module 150 may provide a solution that is applied to the terminal device 130 and that includes a wireless communication technology such as LTE, NR, or future mobile communication. The wireless communication module 160 may provide a solution that is applied to the terminal device 130 and that includes a wireless communication technology such as WLAN (for example, a Wi-Fi network), Bluetooth (BT), global navigation satellite system (GNSS), frequency modulation (FM), near field communication (NFC), and infrared. In some embodiments, the antenna 1 of the terminal device 130 is coupled to the mobile communication module 150, and the antenna 2 is coupled to the wireless communication module 160, so that the terminal device 130 can communicate with a network and another device by using a wireless communication technology.

In some embodiments, functions of the memory 1302 in FIG. 12 may be implemented by using an internal memory 121 in FIG. 13, an external memory connected to an external memory interface 102, or the like.

In some embodiments, functions of the output device 1304 in FIG. 12 may be implemented by using a display 194 in FIG. 13.

In some embodiments, functions of the input device 1305 in FIG. 12 may be implemented by using a mouse, a keyboard, a touchscreen device, or a sensor module 180 in FIG. 13.

In some embodiments, as shown in FIG. 13, the terminal device 130 may further include one or more of an audio module 170, a camera 193, a button 190, a SIM card interface 195, a USB interface 103, a charging management module 140, a power management module 141, and a battery 142.

It may be understood that the structure shown in FIG. 13 does not constitute a specific limitation on the terminal device 130. For example, in other embodiments of this application, the terminal device 130 may include more or fewer components than those shown in the figure, or some components may be combined, or some components may be split, or the components may be differently arranged. The components shown in the figure may be implemented by using hardware, software, or a combination of software and hardware.

With reference to FIG. 1 to FIG. 13, the following describes the measurement method provided in this embodiment of this application by using an example in which the network device 120 shown in FIG. 11 interacts with any terminal device 130.

It should be noted that names of messages between network elements, names of parameters in the messages, or the like in the following embodiments of this application are merely examples, and there may be other names in a specific implementation. This is not specifically limited in embodiments of this application.

Figure 14:
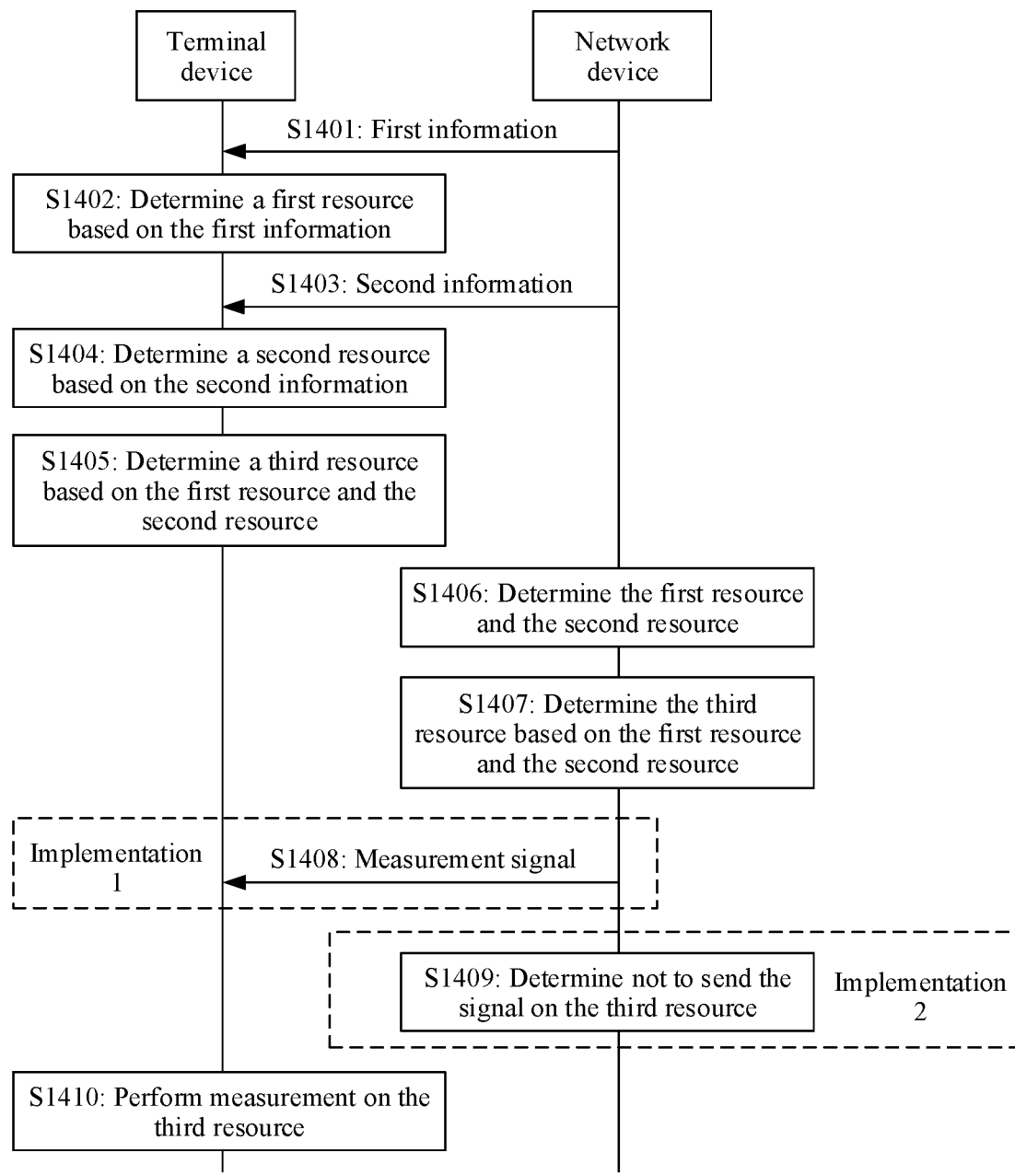
FIG. 14 is a flowchart of a measurement method according to an embodiment of this application.

FIG. 14 shows a measurement method according to an embodiment of this application. The measurement method includes steps S1401 to S1407.

S1401: A network device sends first information to a terminal device. Correspondingly, the terminal device receives the first information from the network device.

Optionally, the first information in this embodiment of this application may be carried in higher layer signaling sent by the network device to the terminal device. In a possible implementation, the first information may be configuration information of CSI measurement, including a measurement report configuration, a measurement resource configuration, an association configuration between a measurement report and a measurement resource, and the like. For related descriptions, refer to the existing third generation partnership project (3GPP) technical specification (TS) 38.331 V15.7.0 and 3GPP TS 38.214 V15.7.0. Details are not described herein.

S1402: The terminal device determines a first resource based on the first information.

The first resource in this embodiment of this application is a configured resource for measurement.

S1403: The network device sends second information to the terminal device. Correspondingly, the terminal device receives the second information from the network device.

In a possible implementation, the second information in this embodiment of this application is configuration information of a rate matching resource. In this implementation, the configuration information of the rate matching resource may be carried in the higher layer signaling sent by the network device to the terminal device.

In another possible implementation, the second information in this embodiment of this application is a PI. In this implementation, the PI may be carried in DCI sent by the network device to the terminal device.

S1404: The terminal device determines a second resource based on the second information.

When the second information is the configuration information of the rate matching resource, the second resource in this embodiment of this application is the rate matching resource. When the second information is the PI, the second resource in this embodiment of this application is a pre-emption resource indicated by the PI.

It should be noted that, in embodiments of this application, when the second resource is the pre-emption resource indicated by the PI, the network device may further send configuration information of the PI to the terminal device. Correspondingly, the terminal device receives the configuration information of the PI from the network device. The configuration information of the PI is for determining a resource location in which the PI is located.

Optionally, there is no necessary execution sequence between step S1403 and step S1401 in this embodiment of this application. Step S1401 may be performed before step S1403, step S1403 may be performed before step S1401 is performed, or step S1401 and step S1403 may be performed simultaneously. This is not specifically limited in this embodiment of this application.

S1405: The terminal device determines a third resource based on the first resource and the second resource, where the third resource includes a part of or all resources in the first resource except a first overlapping resource, and the first overlapping resource is an overlapping resource of the first resource and the second resource.

Optionally, in this embodiment of this application, that the third resource includes a part of or all resources in the first resource except a first overlapping resource may specifically mean that the third resource is a resource that is in the first resource and that does not overlap a fourth resource, the fourth resource includes a resource in a first frequency domain range and a first time domain symbol of the first resource, the first time domain symbol is a time domain symbol in a time domain resource corresponding to the first overlapping resource, the first frequency domain range includes a frequency domain range in which a second overlapping resource is located, and the second overlapping resource is an overlapping resource in the first time domain symbol of the first overlapping resource.

Figure 15:
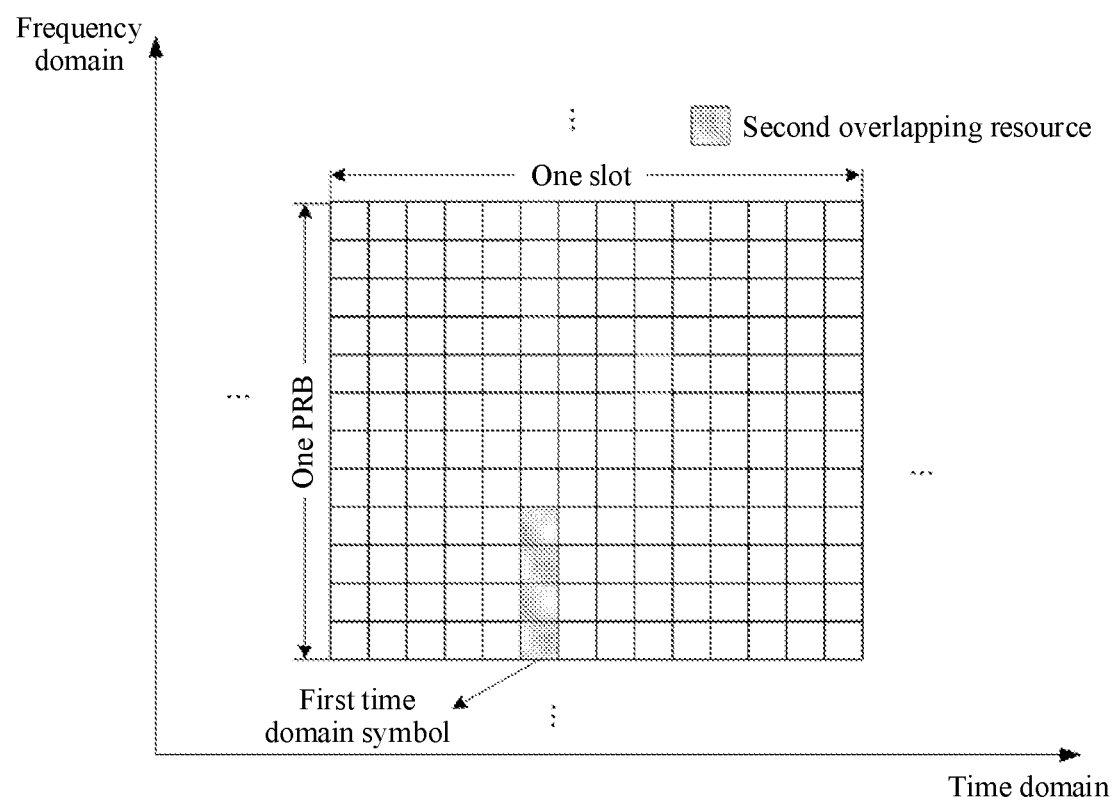
FIG. 15 is a schematic diagram 1 of a location of a second overlapping resource according to an embodiment of this application.

For example, if FIG. 15 shows the overlapping resource in the first time domain symbol of the first overlapping resource (that is, the second overlapping resource), the first frequency domain range includes a frequency domain range in which four REs in the second overlapping resource are located.

In a possible implementation, when the measurement performed by the terminal device is broadband measurement, the first frequency domain range is a frequency domain range corresponding to the first resource.

For example, the broadband measurement in embodiments of this application may include broadband CSI measurement or broadband non-CSI measurement. The broadband non-CSI measurement may include, for example, L1-RSRP measurement.

Figure 16:
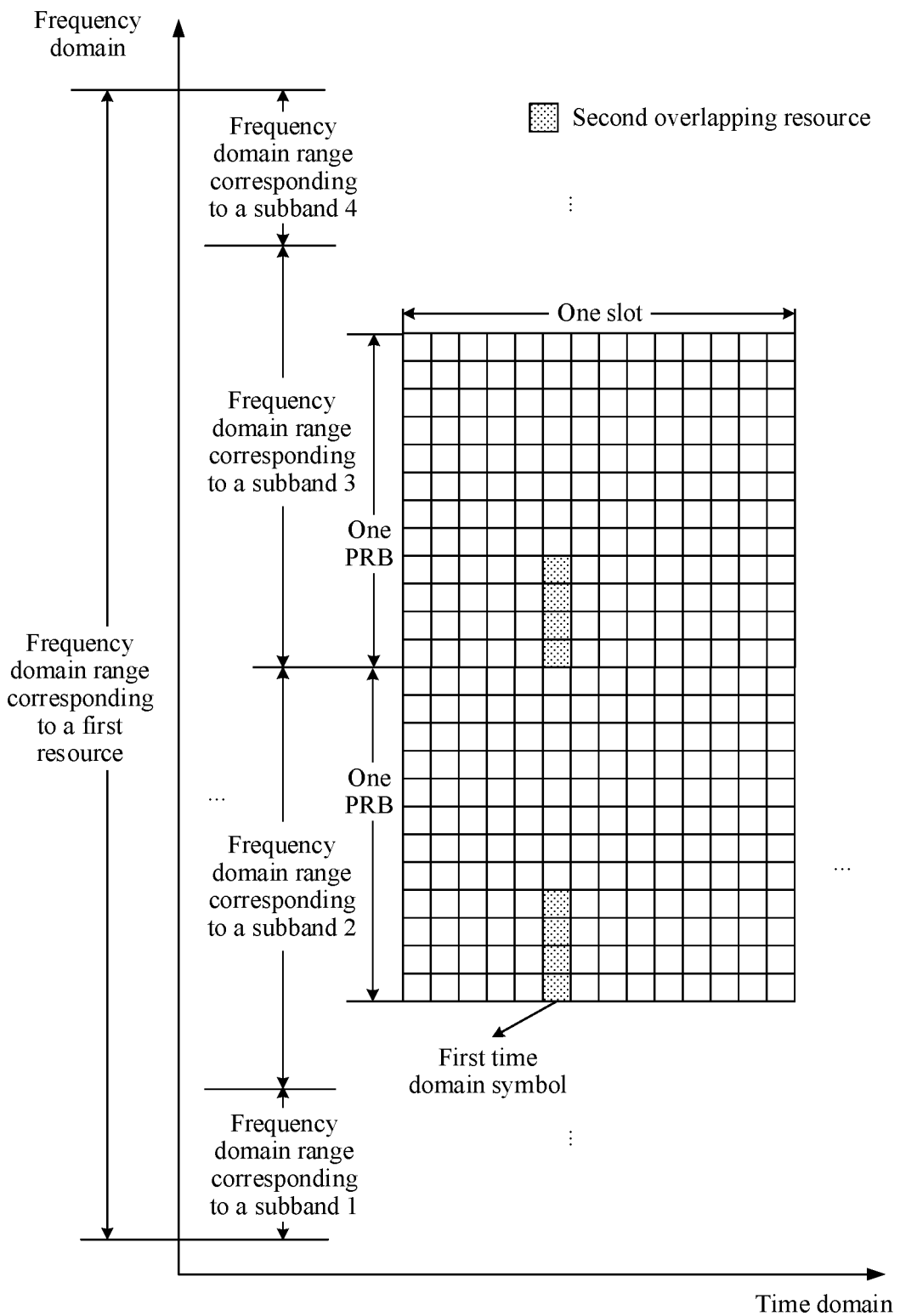
FIG. 16 is a schematic diagram 2 of a location of a second overlapping resource according to an embodiment of this application.

It is assumed that the first resource is a CSI-RS measurement resource, a quantity of CSI-RS antenna ports configured by a higher layer is 4, a CDM type is fd-CDM2, and FIG. 6 shows location distribution of corresponding antenna ports. When the measurement performed by the terminal device is broadband measurement, a frequency domain range of the CSI-RS measurement resource configured via the higher layer signaling is a plurality of consecutive PRBs, and FIG. 16 shows the overlapping resource in the first time domain symbol of the first overlapping resource (that is, the second overlapping resource), the first frequency domain range is a frequency domain range corresponding to the plurality of consecutive PRBs in the first time domain symbol. That is, the first frequency domain range is a frequency domain range of the first resource configured via the higher layer signaling.

In another possible implementation, when the measurement performed by the terminal device is subband measurement, the first frequency domain range is a frequency domain range corresponding to a subband in which the second overlapping resource is located.

For example, the subband measurement in this embodiment of this application may include subband CSI measurement.

It is assumed that the first resource is a CSI-RS measurement resource, a quantity of CSI-RS antenna ports configured by a higher layer is 4, a CDM type is fd-CDM2, and FIG. 6 shows location distribution of corresponding antenna ports. When the measurement performed by the terminal device is subband measurement, and FIG. 16 shows the second overlapping resource (that is, four REs in one PRB belong to a subband 2, and four REs in another PRB belong to a subband 3), the first frequency domain range is a frequency domain range corresponding to the subband 2 and a frequency domain range corresponding to the subband 3. That is, the first frequency domain range is a PRB included in a subband in which the second overlapping resource is located.

It should be noted that the foregoing three examples are described by using an overlapping resource in one first time domain symbol as an example. If the first resource and the second resource overlap each other in a plurality of first time domain symbols, the fourth resource includes resources in a first frequency domain range and the plurality of first time domain symbols of the first resource. For a manner of determining a first frequency domain range corresponding to each first time domain symbol, refer to the manner of determining the first frequency domain range corresponding to the first time domain symbol in the foregoing example. Details are not described herein again.

Further, the fourth resource may further include a resource in the first frequency domain range and a second time domain symbol of the first resource, and the second time domain symbol is a time domain symbol in a time domain CDM relationship with the second overlapping resource.

Figure 17:
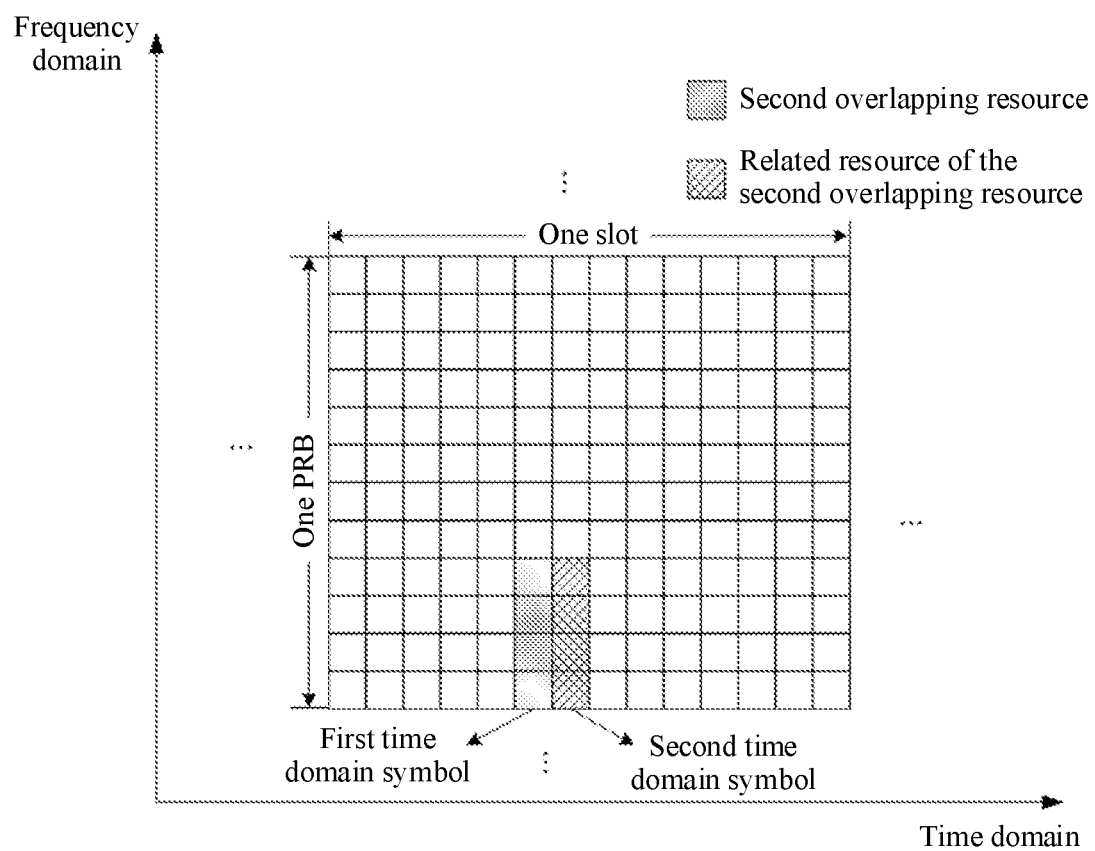
FIG. 17 is a schematic diagram 3 of a location of a second overlapping resource according to an embodiment of this application.

It is assumed that the first resource is a CSI-RS measurement resource, a quantity of CSI-RS antenna ports configured by a higher layer is 8, a CDM type is cdm4-FD2-TD2, FIG. 8 shows location distribution of corresponding antenna ports, and FIG. 17 shows the second overlapping resource. The fourth resource includes not only four REs in the second overlapping resource, but also a related resource of the second overlapping resource, for example, four REs in the second time domain symbol. Because the four REs in the second time domain symbol have a time domain CDM relationship with the four REs in the first time domain symbol, CSI-RSs carried in the eight REs are mapped to the eight antenna ports through CDM. When CSI-RSs carried in the four REs in the first time domain symbol are punctured, CSI-RSs carried in the four REs in the second time domain symbol cannot be correctly demodulated.

It should be noted that, in the foregoing example is described by using an example in which the first frequency domain range is a frequency domain range in which the second overlapping resource is located. Certainly, the first frequency domain range may alternatively be a frequency domain range corresponding to the first resource, or the first frequency domain range may be a frequency domain range corresponding to a subband in which the second overlapping resource is located. Details are not described herein again.

S1406: The network device determines the first resource and the second resource.

For related descriptions of the first resource, refer to the foregoing step S1402. For related descriptions of the second resource, refer to the foregoing step S1404. Details are not described herein again.

Specifically, the network device may determine the first resource based on a measurement requirement.

Specifically, when the second resource is the rate matching resource, the network device may determine the second resource based on a forward or backward compatibility requirement. When the second resource is a pre-emption resource, the network device may determine the second resource based on scheduling of URLLC service data.

It should be noted that there is no necessary execution sequence between step S1406 and step S1401 or step S1403 in this embodiment of this application. Step S1406 may be performed before step S1401 or step S1403, step S1401 or step S1403 may be performed before step S1406, or step S1406 and step S1401 or step S1403 may be performed simultaneously. This is not specifically limited in this embodiment of this application.

S1407: The network device determines the third resource based on the first resource and the second resource.

For a manner in which the network device determines the third resource based on the first resource and the second resource, refer to the manner in step S1405 in which the terminal device determines the third resource based on the first resource and the second resource. Details are not described herein again.

It should be noted that if the foregoing step S1401 or step S1403 is performed after step S1406, there is no necessary execution sequence between step S1407 and step S1401 or step S1403 in this embodiment of this application. Step S1407 may be performed before step S1401 or step S1403, step S1401 or step S1403 may be performed before step S1407, or step S1407 and step S1401 or step S1403 may be performed simultaneously. This is not specifically limited in this embodiment of this application.

Further, in a possible implementation 1, the measurement method provided in this embodiment of this application further includes the following step S1408.

S1408: The network device sends, on the third resource, a measurement signal to the terminal device. Correspondingly, the terminal device receives, on the third resource, the measurement signal from the network device.

When the first resource is a CSI-RS resource, the measurement signal herein may be a CSI-RS. When the first resource is a CSI-IM resource, the measurement signal herein may be a CSI-IM.

Alternatively, in a possible implementation 2, the measurement method provided in this embodiment of this application further includes the following step S1409.

S1409: The network device determines not to send the signal on the third resource.

When the first resource is a CSI-IM resource, a signal that is not sent on the third resource may be, for example, a wanted signal such as a PDSCH of a current cell.

Further, the measurement method provided in this embodiment of this application further includes the following step S1410.

S1410: The terminal device performs measurement on the third resource.

When the first resource is the CSI-RS resource, the terminal device may perform channel measurement and/or interference measurement based on an NZP CSI-RS received on the third resource. Alternatively, when the first resource is the CSI-IM resource, the terminal device may perform interference measurement on the third resource.

Based on the measurement method provided in this embodiment of this application, the terminal device in this embodiment of this application performs measurement on a part of or all resources in the first resource except the first overlapping resource. In other words, the terminal device does not perform measurement on the overlapping resource of the first resource and the second resource, or the terminal device performs measurement neither on the overlapping resource of the first resource and the second resource nor on a related resource of the overlapping resource. Therefore, measurement performance degradation caused by interference from another signal on the measurement resource can be avoided.

Actions of the network device in steps S1401 to S1410 may be performed by the processor 1201 in the network device 120 shown in FIG. 12 by invoking application program code stored in the memory 1202. Actions of the terminal device in steps S1401 to S1410 may be performed by the processor 1301 in the terminal device 130 shown in FIG. 12 by invoking application program code stored in the memory 1302.

Figure 18:
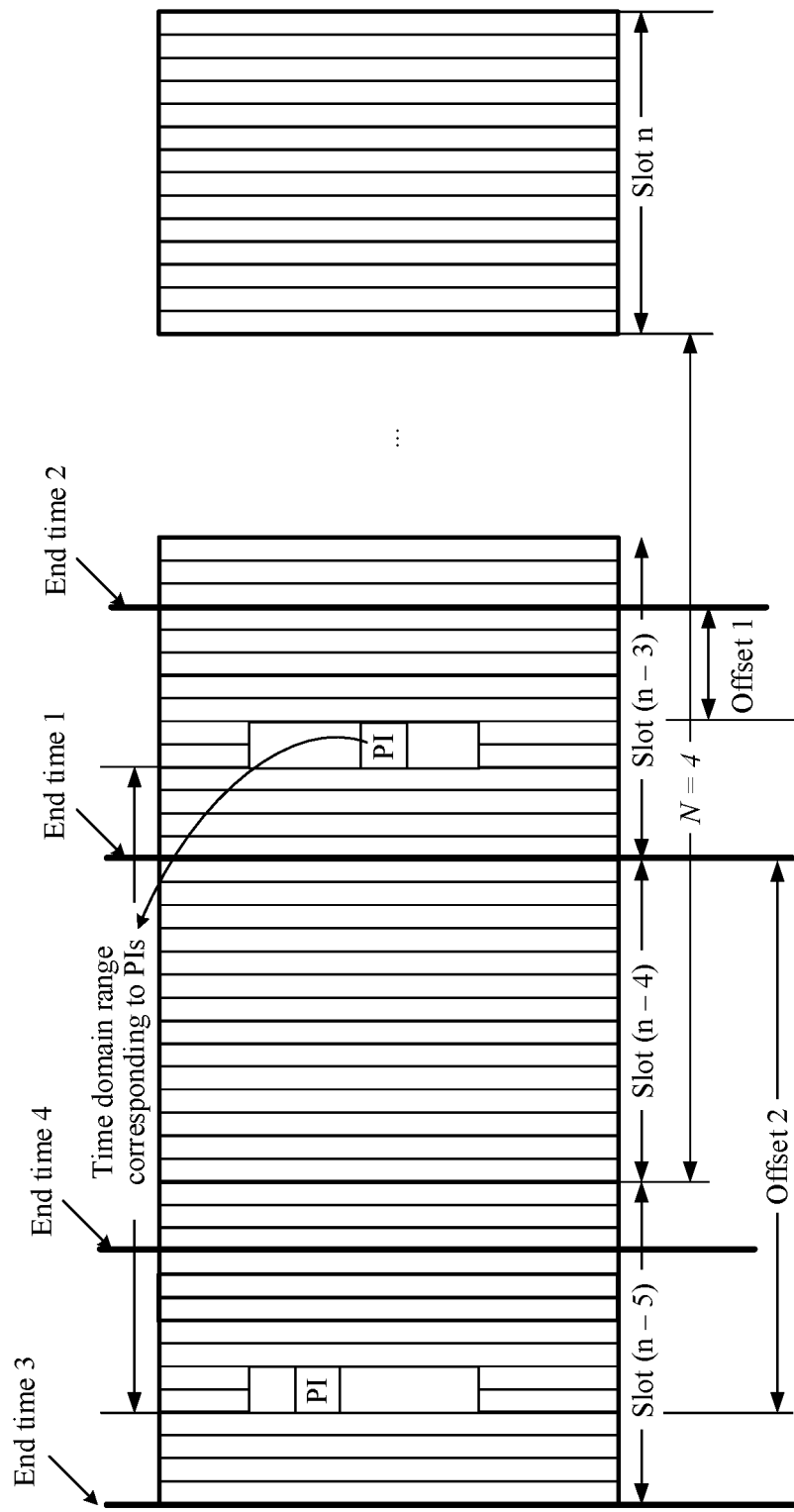
FIG. 18 is a schematic diagram of location distribution of a first resource and a second resource according to an embodiment of this application.

Further, with reference to the foregoing descriptions of the PI, it can be learned that, when the second resource is the pre-emption resource indicated by the PI, the pre-emption resource indicated by the PI may be learned based on the DCI carrying the PI. With reference to the foregoing descriptions of CSI measurement and reporting, it can be learned that one CSI report corresponds to one CSI reference resource, and a measurement resource used by the CSI report is not later than the CSI reference resource. As shown in FIG. 18, a downlink slot corresponding to time for sending the CSI report is a slot n, and a downlink slot corresponding to the CSI reference resource is a slot (n−4). That is, the sent CSI report is obtained through measurement based on a measurement resource before the end time 1. If processing time of the $2^{nd}$ PI in FIG. 18 is an offset 1, the terminal device can determine overlapping information only when the terminal device learns of, at a location of the end time 2, pre-emption information in a time domain range corresponding to the $2^{nd}$ PI. The terminal device may originally perform CSI measurement based on a measurement resource in an area of an offset 2. However, the CSI measurement can start at the end time 2 only after PI parsing is completed. As a result, a CSI report obtained based on the measurement resource in the area of the offset 2 may not be sent in a slot n in time. To resolve this problem, in this embodiment of this application, a time domain resource of the first resource may be designed to be not later than a time domain location of a CSI reference resource corresponding to the CSI report, and the time domain location of the CSI reference resource is a downlink slot (n−N−K) when the second resource is the pre-emption resource indicated by the PI, where $$n = \left\lfloor n' \cdot \frac{2^{\mu_{DL}}}{2^{\mu_{UL}}} \right\rfloor,$$

$\mu_{DL}$ and $\mu_{UL}$ are respectively an index of a downlink subcarrier spacing and an index of an uplink subcarrier spacing, and N is determined based on a parameter in the first information. For example, N is determined based on a quantity of CSI resources corresponding to the measurement in the measurement report configuration in the first information. For related descriptions, refer to the existing 3GPP TS 38.331 V15.7.0 and 3GPP TS 38.214 V15.7.0. Details are not described herein again. Both N and K are non-negative integers, and n' is a slot index (which may also be referred to as a slot number) for sending the CSI report.

For a value of K, details are as follows:

In a possible implementation, the network device determines the value of K, and then the network device sends third information to the terminal device. Correspondingly, the terminal device receives the third information from the network device. The third information indicates the value of K. Optionally, in this embodiment of this application, the network device may determine the value of K based on time for processing a PDCCH by the terminal device and/or a time domain periodicity of a PI. Certainly, the network device may alternatively determine the value of K in another manner. This is not specifically limited in this embodiment of this application.

In another possible implementation, the terminal device determines the value of K. For example, the terminal device determines the value of K based on processing time of a PDCCH and/or a time domain periodicity of a PI. This is not specifically limited in this embodiment of this application.

For example, as shown in FIG. 18, it is assumed that N=4 and K=2, which means that the sent CSI report is obtained through measurement based on a measurement resource before the end time 3. If parsing duration of all PIs is the same, the Pt PI in FIG. 18 can be obtained through parsing at the end time 4. At this time, overlapping information may be determined, and then CSI measurement may be performed. Because the end time 4 is earlier than the end time 1, a signal on a measurement resource before the end time 3 starts to be measured at the end time 4, and the obtained CSI report can be sent in the slot n in time.

It may be understood that, in the foregoing embodiments, the methods and/or steps implemented by the terminal device may alternatively be implemented by a chip or chip system that implements functions of the terminal device, and the methods and/or steps implemented by the network device may alternatively be implemented by a chip or chip system that implements functions of the network device.

The foregoing mainly describes the solutions provided in embodiments of this application from a perspective of interaction between network elements. Correspondingly, embodiments of this application further provide a communication apparatus. The communication apparatus is configured to implement the foregoing methods. The communication apparatus may be the terminal device in the foregoing method embodiments or a chip system that implements functions of the terminal device. Alternatively, the communication apparatus may be the network device in the foregoing method embodiments or a chip system that implements functions of the network device. It may be understood that, to implement the foregoing functions, the communication apparatus includes a corresponding hardware structure and/or software module for performing each function. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

Figure 19:
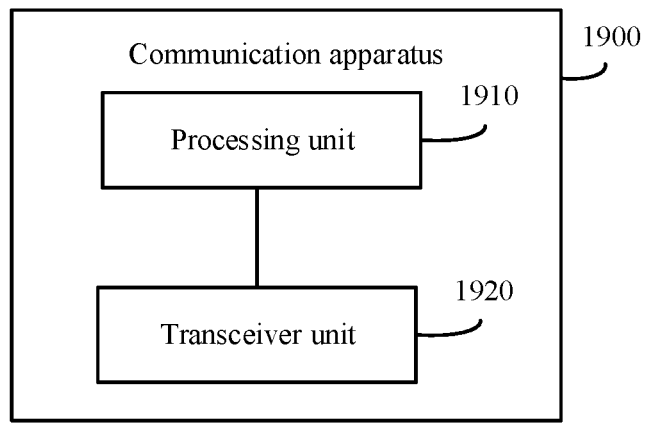
FIG. 19 is a schematic diagram 1 of a structure of a communication apparatus according to an embodiment of this application.
Figure 20:
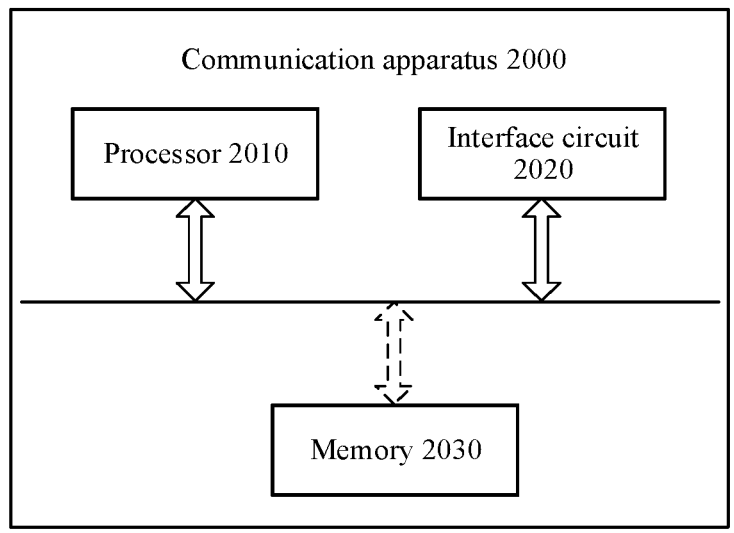
FIG. 20 is a schematic diagram 2 of a structure of a communication apparatus according to an embodiment of this application.

FIG. 19 and FIG. 20 each are a schematic diagram of a structure of a possible communication apparatus according to an embodiment of this application. The communication apparatuses can be configured to implement functions of the terminal device or the network device in the foregoing method embodiments, and therefore, can also implement beneficial effects of the foregoing method embodiments. In embodiments of this application, the communication apparatus may be the terminal device 130 shown in FIG. 11, may be the network device 120 shown in FIG. 11, or may be a module (for example, a chip) used in a terminal device or a network device.

As shown in FIG. 19, a communication apparatus 1900 includes a processing unit 1910 and a transceiver unit 1920. The communication apparatus 1900 is configured to implement functions of the terminal device or the network device in the method embodiment shown in FIG. 14.

When the communication apparatus 1900 is configured to implement functions of the terminal device in the method embodiment shown in FIG. 14, the transceiver unit 1920 is configured to receive first information and second information from the network device. The processing unit 1910 is configured to determine a first resource based on the first information, determine a second resource based on the second information, and determine a third resource based on the first resource and the second resource. The third resource includes a part of or all resources in the first resource except a first overlapping resource, and the first overlapping resource is an overlapping resource of the first resource and the second resource. The processing unit 1910 is further configured to perform measurement on the third resource.

Optionally, a time domain resource of the first resource is not later than a time domain location of a CSI reference resource corresponding to a CSI report, and the time domain location of the CSI reference resource is a downlink slot (n−N−K) when the second resource is a pre-emption resource indicated by a PI, where $$n = \left\lfloor n' \cdot \frac{2^{\mu_{DL}}}{2^{\mu_{UL}}} \right\rfloor,$$

$\mu_{DL}$ and $\mu_{UL}$ are respectively an index of a downlink SCS and an index of an uplink SCS, N is determined based on a parameter in the first information, both N and K are non-negative integers, and n' is a slot index for sending the CSI report.

In a possible implementation, the transceiver unit 1920 is further configured to receive third information from the network device. The third information indicates a value of K.

In another possible implementation, the processing unit 1910 is further configured to determine the value of K based on processing time of a PDCCH and/or a time domain periodicity of the PI.

When the communication apparatus 1900 is configured to implement functions of the network device in the method embodiment shown in FIG. 14, the transceiver unit 1920 is configured to send first information and second information. The first information indicates a first resource, and the second information indicates a second resource. The processing unit 1910 is configured to determine a third resource based on the first resource and the second resource. The third resource includes a part of or all resources in the first resource except a first overlapping resource, and the first overlapping resource is an overlapping resource of the first resource and the second resource. The transceiver unit 1920 is further configured to send a measurement signal on the third resource, or the processing unit 1910 is further configured to determine not to send a signal on the third resource.

Optionally, a time domain resource of the first resource is not later than a time domain location of a CSI reference resource corresponding to a CSI report, and the time domain location of the CSI reference resource is a downlink slot (n–N–K) when the second resource is a pre-emption resource indicated by a PI, where $$n = \left\lfloor n' \cdot \frac{2^{\mu_{DL}}}{2^{\mu_{UL}}} \right\rfloor,$$

$\mu_{DL}$ and $\mu_{UL}$ are respectively an index of a downlink SCS and an index of an uplink SCS, N is determined based on a parameter in the first information, both N and K are non-negative integers, and n' is a slot index for sending the CSI report.

In a possible implementation, the transceiver unit 1920 is further configured to send third information. The third information indicates a value of K.

For more detailed descriptions of the processing unit 1910 and the transceiver unit 1920, directly refer to related descriptions of the method embodiment shown in FIG. 14. Details are not described herein again.

In this embodiment, the communication apparatus 1900 is presented in a form of functional modules obtained through division in an integrated manner. The "module" herein may be a specific ASIC, a circuit, a processor executing one or more software or firmware programs, a memory, an integrated logic circuit, and/or another component that can provide the foregoing function. In a simple embodiment, when the communication apparatus 1900 is configured to implement functions of the terminal device in the method embodiment shown in FIG. 14, a person skilled in the art may figure out that the communication apparatus 1900 may be in a form of the terminal device 130 shown in FIG. 12. Alternatively, when the communication apparatus 1900 is configured to implement functions of the network device in the method embodiment shown in FIG. 14, a person skilled in the art may figure out that the communication apparatus 1900 may be in a form of the network device 120 shown in FIG. 12.

For example, the processor 1201 in the network device 120 shown in FIG. 12 may invoke computer-executable instructions stored in the memory 1202, so that the network device 120 performs the measurement method in the foregoing method embodiment.

Specifically, functions/implementation processes of the processing unit 1910 and the transceiver unit 1920 in FIG. 19 may be implemented by the processor 1201 in the network device 120 shown in FIG. 12 by invoking the computer-executable instructions stored in the memory 1202. Alternatively, functions/implementation processes of the processing unit 1910 in FIG. 19 may be implemented by the processor 1201 in the network device 120 shown in FIG. 12 by invoking the computer-executable instructions stored in the memory 1202, and functions/implementation processes of the transceiver unit 1920 in FIG. 19 may be implemented by the transceiver 1203 in the network device 120 shown in FIG. 12.

For another example, the processor 1301 in the terminal device 130 shown in FIG. 12 may invoke computer-executable instructions stored in the memory 1302, so that the terminal device 130 performs the measurement method in the foregoing method embodiment.

Specifically, functions/implementation processes of the processing unit 1910 and the transceiver unit 1920 in FIG. 19 may be implemented by the processor 1301 in the terminal device 130 shown in FIG. 13 by invoking the computer-executable instructions stored in the memory 1302. Alternatively, functions/implementation processes of the processing unit 1910 in FIG. 19 may be implemented by the processor 1301 in the terminal device 130 shown in FIG. 13 by invoking computer-executable instructions stored in the memory 1302, and functions/implementation processes of the transceiver unit 1920 in FIG. 19 may be implemented by the transceiver 1303 in the terminal device 130 shown in FIG. 13.

As shown in FIG. 20, a communication apparatus 2000 includes a processor 2010 and an interface circuit 2020. The processor 2010 and the interface circuit 2020 are coupled to each other. It may be understood that the interface circuit 2020 may be a transceiver or an input/output interface. For related descriptions of a type of the processor 2010, refer to the embodiment shown in FIG. 12. Details are not described herein again.

Optionally, the communication apparatus 2000 may further include a memory 2030, configured to store instructions to be executed by the processor 2010, store input data required for executing the instructions by the processor 2010, or store data generated after the processor 2010 executes the instructions. For related descriptions of a type of the memory 2030, refer to the embodiment shown in FIG. 12. Details are not described herein again.

When the communication apparatus 2000 is configured to implement the method shown in FIG. 14, the processor 2010 is configured to perform functions of the processing unit 1910, and the interface circuit 2020 is configured to perform functions of the transceiver unit 1920.

When the communication apparatus is a chip used in a terminal device, the chip of the terminal device implements the functions of the terminal device in the foregoing method embodiments. The chip of the terminal device receives information from another module (for example, a radio frequency module or an antenna) in the terminal device, where the information is sent by a network device to the terminal device. Alternatively, the chip of the terminal device sends information to another module (for example, a radio frequency module or an antenna) in the terminal device, where the information is sent by the terminal device to a network device.

When the communication apparatus is a chip used in a network device, the chip of the network device implements the functions of the network device in the foregoing method embodiments. The chip of the network device receives information from another module (for example, a radio frequency module or an antenna) in the network device, where the information is sent by a terminal device to the network device. Alternatively, the chip of the network device sends information to another module (for example, a radio frequency module or an antenna) in the network device, where the information is sent by the network device to a terminal device.

The method steps in embodiments of this application may be implemented by hardware, or may be implemented by a processor executing software instructions. The software instructions include a corresponding software module. The software module may be stored in a RAM, a flash memory, a ROM, a PROM, an EPROM, an EEPROM, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be disposed in a network device or a terminal device. Certainly, the processor and the storage medium may exist in a network device or a terminal device as discrete components.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer programs or instructions. When the computer programs or instructions are loaded and executed on a computer, all or a part of the procedures or functions in embodiments of this application are performed. The computer may be a general-purpose computer, a dedicated computer, a computer network, a network device, user equipment, or another programmable apparatus. The computer programs or the instructions may be stored in a computer-readable storage medium, or may be transmitted from a computer-readable storage medium to another computer-readable storage medium. For example, the computer programs or the instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; may be an optical medium, for example, a digital video disc (digital video disc, DVD); or may be a semiconductor medium, for example, a solid-state drive (solid-state drive, SSD).

In embodiments of this application, unless otherwise stated or there is a logical conflict, terms and/or descriptions between different embodiments are consistent and may be mutually referenced, and technical features in different embodiments may be combined based on an internal logical relationship thereof, to form a new embodiment.

In this application, "at least one" means one or more, and "a plurality of" means two or more. "And/or" describes an association relationship between associated objects and represents that three relationships may exist. For example, A and/or B may represent the following three cases: Only A exists, both A and B exist, and only B exists. A and B may be in a singular or plural form. The symbol "/" in the text description of this application generally represents an "or" relationship between associated objects. In a formula of this application, the symbol "/" indicates a "division" relationship between associated objects.

It may be understood that various numbers in embodiments of this application are merely for ease of distinguishing, and are not intended to limit the scope of embodiments of this application. The sequence numbers of the foregoing processes do not mean an execution sequence, and the execution sequence of the processes should be determined according to functions and internal logic of the processes. In addition, in embodiments of this application, words such as "first" and "second" are used to distinguish between same items or similar items having basically same functions and effects. A person skilled in the art may understand that the terms such as "first" and "second" do not limit a quantity and an execution sequence, and the terms such as "first" and "second" do not mean being definitely different, either.

Finally, it should be noted that, in embodiments of this application, the word "example" or "for example" is used to represent giving an example, an illustration, or a description. Any embodiment or design scheme described as an "example" or with "for example" in embodiments of this application should not be explained as being more preferred or having more advantages than another embodiment or design scheme. Exactly, use of the word "example", "for example", or the like is intended to present a relative concept in a specific manner for ease of understanding.

What is claimed is:

1. A measurement method, wherein the measurement method comprises:
receiving first information and second information from a network device;
determining a first resource based on the first information;
determining a second resource based on the second information, wherein the second information is configuration information of a rate matching resource, and the second resource is the rate matching resource;
determining a third resource based on the first resource and the second resource, wherein the third resource is a resource that is in the first resource and that does not overlap a fourth resource, wherein the fourth resource comprises a resource in a first frequency domain range and a first time domain symbol of the first resource, wherein the first time domain symbol is a time domain symbol in a time domain resource corresponding to a first overlapping resource, and wherein the first overlapping resource is an overlapping resource of the first resource and the second resource; and
performing measurement on the third resource.

2. The measurement method according to claim 1, wherein
the first frequency domain range comprises a frequency domain range in which a second overlapping resource is located, and
the second overlapping resource is an overlapping resource in the first time domain symbol of the first overlapping resource.

3. The measurement method according to claim 2, wherein the fourth resource further comprises a resource in the first frequency domain range and a second time domain symbol of the first resource, and wherein the second time domain symbol is a time domain symbol in a time domain code division multiplexing (CDM) relationship with the second overlapping resource.

4. The measurement method according to claim 2, wherein:
when the measurement is a broadband measurement, the first frequency domain range is a frequency domain range corresponding to the first resource; or
when the measurement is a subband measurement, the first frequency domain range is a frequency domain range corresponding to a subband in which the second overlapping resource is located.

5. The measurement method according to claim 1, wherein:
a time domain resource of the first resource is not later than a time domain location of a channel state information (CSI) reference resource corresponding to a CSI report.

6. The measurement method according to claim 5, wherein the measurement method further comprises:
receiving third information from the network device, wherein the third information indicates a value of K.

7. An apparatus, comprising:
one or more processors; and
one or more memories coupled to the one or more processors and storing program instructions for execution by the one or more processors to:

send first information and second information, wherein the first information indicates a first resource, and the second information indicates a second resource, wherein the second information is configuration information of a rate matching resource, and the second resource is the rate matching resource;

determine a third resource based on the first resource and the second resource, wherein the third resource is a resource that is in the first resource and that does not overlap a fourth resource, wherein the fourth resource comprises a resource in a first frequency domain range and a first time domain symbol of the first resource, wherein the first time domain symbol is a time domain symbol in a time domain resource corresponding to a first overlapping resource, and wherein the first overlapping resource is an overlapping resource of the first resource and the second resource; and send a measurement signal on the third resource, or determining not to send a signal on the third resource.

8. The apparatus according to claim 7, wherein the first frequency domain range comprises a frequency domain range in which a second overlapping resource is located, and the second overlapping resource is an overlapping resource in the first time domain symbol of the first overlapping resource.

9. The apparatus according to claim 8, wherein the fourth resource further comprises a resource in the first frequency domain range and a second time domain symbol of the first resource, and wherein the second time domain symbol is a time domain symbol in a time domain code division multiplexing CDM relationship with the second overlapping resource.

10. The apparatus according to claim 8, wherein:
when a measurement on the third resource is a broadband measurement, the first frequency domain range is a bandwidth corresponding to the first resource; or
when a measurement on the third resource is a subband measurement, the first frequency domain range is a frequency domain range corresponding to a subband in which the second overlapping resource is located.

11. The apparatus according to claim 7, wherein:
a time domain resource of the first resource is not later than a time domain location of a CSI reference resource corresponding to a channel state information (CSI) report.

12. An apparatus, comprising:
one or more processors; and
one or more memories coupled to the one or more processors and storing program instructions for execution by the one or more processors to:
receive first information and second information from a network device;
determine a first resource based on the first information;
determine a second resource based on the second information, wherein the second information is configuration information of a rate matching resource, and the second resource is the rate matching resource;
determine a third resource based on the first resource and the second resource, wherein the third resource is a resource that is in the first resource and that does not overlap a fourth resource, wherein the fourth resource comprises a resource in a first frequency domain range and a first time domain symbol of the first resource, wherein the first time domain symbol is a time domain symbol in a time domain resource corresponding to a first overlapping resource, and wherein the first overlapping resource is an overlapping resource of the first resource and the second resource; and
perform measurement on the third resource.

13. The apparatus according to claim 12, wherein
the first frequency domain range comprises a frequency domain range in which a second overlapping resource is located, and
the second overlapping resource is an overlapping resource in the first time domain symbol of the first overlapping resource.

14. The apparatus according to claim 13, wherein the fourth resource further comprises a resource in the first frequency domain range and a second time domain symbol of the first resource, and wherein the second time domain symbol is a time domain symbol in a time domain code division multiplexing (CDM) relationship with the second overlapping resource.

15. The apparatus according to claim 13, wherein:
when the measurement is a broadband measurement, the first frequency domain range is a frequency domain range corresponding to the first resource; or
when the measurement is a subband measurement, the first frequency domain range is a frequency domain range corresponding to a subband in which the second overlapping resource is located.

16. The apparatus according to claim 12, wherein:
a time domain resource of the first resource is not later than a time domain location of a channel state information (CSI) reference resource corresponding to a CSI report.

17. The apparatus according to claim 16, wherein the one or more memories store the program instructions for execution by the one or more processors to:
receive third information from the network device, wherein the third information indicates a value of K.

18. The measurement method according to claim 1, further comprising:
before performing the measurement on the third resource, receiving a measurement signal from the network device on the third resource.

19. The measurement method according to claim 18, wherein:
when the first resource is a channel state information reference signal (CSI-RS) resource, the measurement signal is a CSI-RS; or
when the first resource is a channel state information interference measurement (CSI-IM) resource, the measurement signal is a CSI-IM.

20. The apparatus according to claim 12, wherein the one or more memories store the program instructions for execution by the one or more processors further to:
before performing the measurement on the third resource, receive a measurement signal from the network device on the third resource.

* * * * *